United States Patent
Hughes

(10) Patent No.: US 7,698,431 B1
(45) Date of Patent: Apr. 13, 2010

(54) PRE-POSITIONING DATA IN A NETWORK MEMORY APPLIANCE

(75) Inventor: David Anthony Hughes, Los Altos Hills, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 360 days.

(21) Appl. No.: 11/796,239

(22) Filed: Apr. 27, 2007

Related U.S. Application Data

(63) Continuation-in-part of application No. 11/202,697, filed on Aug. 12, 2005.

(51) Int. Cl.
*G06F 15/173* (2006.01)

(52) U.S. Cl. .............. 709/226; 709/212; 709/214; 709/221; 707/102; 707/203; 707/204

(58) Field of Classification Search .......... 709/220, 709/226, 235, 245, 246, 248, 212, 214, 221; 707/102, 203, 204; 717/170, 171, 176
See application file for complete search history.

(56) References Cited

U.S. PATENT DOCUMENTS

| | | | |
|---|---|---|---|
| 6,718,361 B1 * | 4/2004 | Basani et al. | 709/201 |
| 7,243,094 B2 * | 7/2007 | Tabellion et al. | 707/3 |
| 2004/0117571 A1 | 6/2004 | Chang et al. | |
| 2004/0243571 A1 | 12/2004 | Judd | |
| 2006/0195840 A1 * | 8/2006 | Sundarrajan et al. | 717/176 |

* cited by examiner

*Primary Examiner*—Michael Won
(74) *Attorney, Agent, or Firm*—Carr & Ferrell LLP

(57) ABSTRACT

Systems and methods for pre-positioning data in a network memory are described. A pre-positioning command may be executed to position specific data at one or more network memory appliances before the data is requested at a branch office. For example, the first download of a software update over the communication network at a branch office may require several minutes. To make the first download of the software update faster, the software update may be downloaded previously to the branch appliance. According to various embodiments, the pre-positioning command may comprise a time of transfer and/or a schedule. The data may be received by a pre-positioning receiver such as a file system server, a hypertext transfer protocol server, a file transfer protocol server, or a virtual client.

26 Claims, 16 Drawing Sheets

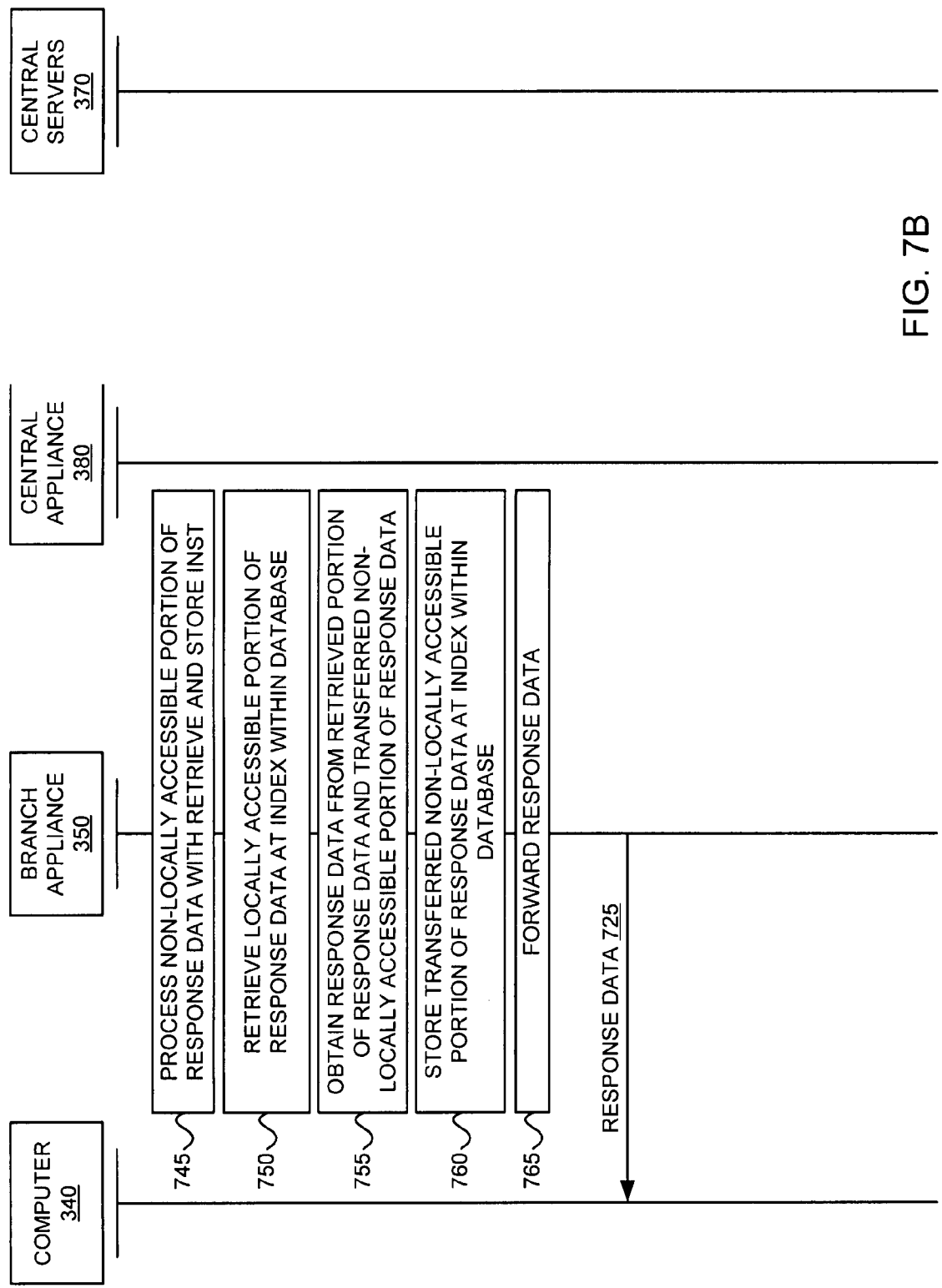

PRE-POSITIONING DATA IN A NETWORK MEMORY APPLIANCE

CROSS-REFERENCES

This nonprovisional United States patent application is a continuation-in-part of nonprovisional U.S. patent application Ser. No. 11/202,697 filed Aug. 12, 2005 and entitled "Network Memory Architecture," which is hereby incorporated by reference.

BACKGROUND

1. Technical Field

The present invention relates generally to network memory and more particularly to a network memory architecture.

2. Description of Related Art

To allow remote employees access to an enterprise's information systems, organizations typically choose between two networking approaches: centralized servers or distributed servers. Centralized server implementations have the advantage of simplicity since an information technology (IT) professional centrally manages, maintains, and enforces policies for the organization's data.

FIG. 1 illustrates a centralized server system 100 in the prior art. The centralized server system 100 includes a branch office 110 and a central office 120 coupled by a communication network 130. The communication network 130 forms a WAN between the branch office 110 and the central office 120.

Typically, the central servers 160 in the central office 120 store the organization's data. Computers 140 make requests for the data from the central servers 160 over the communication network 130. The central servers 160 then return the data to the computers 140 over the communication network 130.

The communication network 130 typically comprises a private network (e.g., a leased line network) or a public network (e.g., the Internet). The connections to the communication network 130 from the branch office 110 and the central office 120 typically cause a bandwidth bottleneck for exchanging the data over the communication network 130. The exchange of the data between the branch office 110 and the central office 120, in the aggregate, will usually be limited to the bandwidth of the slowest link in the communication network 130.

For example, the router 150 connects to the communication network 130 by a T1 line, which provides a bandwidth of approximately 1.544 Megabits/second (Mbps). The router 170 connects to the communication network 130 by a T3 line, which provides a bandwidth of approximately 45 Megabits/second (Mbps). Even though the communication network 130 may provide an internal bandwidth greater than 1.544 Mbps or 45 Mbps, the available bandwidth between the branch office 110 and the central office 120 is limited to the bandwidth of 1.544 Mbps (i.e., the T1 connection). Connections with higher bandwidth to relieve the bandwidth bottleneck across the communication network 130 are available, but are generally expensive and have limited availability.

Moreover, many applications do not perform well over the communication network 130 due to the limited available bandwidth. Developers generally optimize the applications for performance over a local area network (LAN) which typically provides a bandwidth between 10 Mbps to Gigabit/second (Gbps) speeds. The developers of the applications assume small latency and high bandwidth across the LAN between the applications and the data. However, the latency across the communication network 130 typically will be 100 times that across the LAN, and the bandwidth of the communication network 130 will be 1/100th of the LAN.

Alternatively, many organizations select the distributed server implementation to mitigate some of the problems with the centralized server implementation. FIG. 2 illustrates a distributed server system 200 in the prior art. The distributed server system 200 includes a branch office 210, a central office 220, and a communication network 230. The communication network 230 forms a WAN between the branch office 210 and the central office 220.

In the distributed server system 200, the branch servers 240 (e.g., email servers, file servers and databases) are placed locally in the branch office 210, rather than solely in the central office 220. The branch servers 240 typically store all or part of the organization's data. The branch servers 240 generally provide improved application performance and data access. The branch servers 240 respond to a request for the organization's data from the local data. For each request for the data, the central servers 270 potentially do not need to transfer the data over the communication network 130 (i.e., the WAN). Synchronization and backup procedures are implemented to maintain the coherency between the local data in the branch office 210 and the data in the central office 220.

Unfortunately, managing the distributed server system 200 is complex and costly. From a physical point of view, the distributed server system 200 with one hundred branch offices requires an order of one hundred times more equipment than the centralized server approach. Each piece of the equipment not only needs to be purchased, but also installed, managed, and repaired driving significant life cycle costs. The branch office 210 may need additional local IT personnel to perform operations because of this "Server Sprawl". Furthermore, the multiplication of managed devices means additional license costs, security vulnerabilities, and patching activities.

In distributed server implementations (e.g., the distributed server system 200), the data, including the "golden copy" or most up-to-date version of mission critical data, is often stored (at least temporarily) only on the branch servers 240 in the branch office 210. Organizations implement complex protocols and procedures for replication and synchronization to ensure that the mission critical data is backed up and kept in-sync across the WAN with the central servers 270.

Furthermore, although FIG. 1 and FIG. 2 illustrate a single branch office and a single central office, multiple branch offices and multiple central offices exacerbate the previously discussed problems. For example, in a centralized server implementation having multiple branches, computers in each of the multiple branch offices make requests over the WAN to central servers for the organization's data. The data transmitted by the central servers in response to the requests quickly saturate the available bandwidth of the central office's connection to the communication network, further decreasing application performance and data access at the multiple branch offices. In a distributed server implementation having multiple branches, the cost to provide branch servers in each of the multiple branch offices increases, as well as the problems of licensing, security vulnerabilities, patching activities, and data replication and synchronization. Moreover, different branches may simultaneously attempt to modify the same piece of information. Maintaining coherency in a distributed implementation requires complex and error prone protocols.

As well as implementing centralized servers or distributed servers, organizations also implement mechanisms for caching to improve application performance and data access. A cache is generally used to reduce the latency of the communication network (e.g., communication network 230) forming the WAN (i.e., because the request is satisfied from the local cache) and to reduce network traffic over the WAN (i.e., because responses are local, the amount of bandwidth used is reduced).

Web caching, for example, is the caching of web documents (i.e., HTML pages, images, etc.) in order to reduce web site access times and bandwidth usage. Web caching typically stores local copies of the requested web documents. The web cache satisfies subsequent requests for the web documents if the requests meet certain predetermined conditions.

One problem with web caching is that the web cache is typically only effective for rarely modified static web documents. For dynamic documents, there is a difficult trade off between minimizing network traffic and the risk of the web cache serving up stale data. The web cache may serve stale data because the web cache responds to requests without consulting the server.

Another problem is that the web cache does not recognize that two otherwise identical documents are the same if they have different Uniform Resource Locator (URL). The web cache does not consider the content or context of the documents. Thus, the web cache caches the documents by URL or filename without a determination of the content or context of the document. Moreover, the web cache stores entire objects (such as documents) and cache-hits are binary: either a perfect match or a miss. Even where only small changes are made to the documents, the web cache does not use the cached copy of the documents to reduce network traffic.

SUMMARY OF THE INVENTION

The invention addresses the above problems by providing a network memory system and method implemented by the system. A network memory system comprises a first appliance and a second appliance. The first appliance receives data and determines whether a portion of the data is locally accessible to the second appliance. The first appliance generates an instruction based on the determination and transfers the instruction to the second appliance over a communication network. The second appliance receives the instruction from the first appliance over the communication network and processes the instruction to obtain the data. The second appliance then transfers the data to a computer.

Advantageously, the first appliance may not transfer the data over the communication network if the data is locally accessible to the second appliance. Based on the instruction, the second appliance obtains the data and transfers the data to the computer. In one embodiment, the communication network may comprise a wide area network (WAN). The network memory system effectively reduces latency over the communication network, and reduces network traffic by minimizing the amount of data sent over the communication network. In a further advantage, the first appliance may assume the role of the second appliance, and the second appliance may assume the role of the first appliance, thereby reducing network traffic and latency for uni-directional and bi-directional communication over the communication network. The second appliance receives the data and determines whether a portion of the data is locally accessible to the first appliance. The second appliance generates another instruction based on the determination and transfer the another instruction to the first appliance over the communication network. The first appliance receives the another instruction from the second appliance over the communication network and process the another instruction to obtain the data. The first appliance then transfers the data to another computer.

In some embodiments, the first appliance generates the instruction indicating to store the data in a database. The instruction may also indicate to retrieve the data from the database. In some embodiments, the first appliance may generate a plurality of instructions. The plurality of instructions may indicate a plurality of indexes for retrieving the data. The instruction may also indicate an index within the database for the data. Accordingly, the second appliance may store the data in the database based on the instruction. The second appliance may retrieve the data in the database based on the instruction.

The first appliance may transfer to the second appliance a portion of the data that is not locally accessible. The second appliance receives the transferred portion of the data, retrieves the portion of the data that is locally accessible to the second appliance, and processes the portions to obtain the data. The first appliance may receive the data from a computer server. The second appliance may also transfer the data to the computer based on a request for the data over the communication network by the computer. The network memory system therefore provides the advantages and simplicity of centralized data storage, with the ability to quickly retrieve locally accessible data.

Further, in some embodiments, the first appliance further determines whether the data is locally accessible to a third appliance. The first appliance then generates another instruction to the third appliance based on the determination and transfers the another instruction to the third appliance over the communication network. The third appliance receives the another instruction from the first appliance over the communication network and processes the another instructions to obtain the data. The third appliance then transfers the data to another computer. Furthermore, the network memory system may localize a copy of the data in multiple appliance/node implementations without the license fees and expenses, maintenance, and security costs of distributed server hardware.

Further embodiments comprise a pre-positioning controller that executes a pre-positioning command to send data through at least one network memory appliance to a pre-positioning server. The network memory appliance stores the data for positioning in the network memory. The pre-positioning command may indicate a time of transmission of the data and/or be regularly scheduled. The pre-positioning receiver may comprise a file transfer protocol server, a hypertext transfer protocol server, and/or a file system server. In various embodiments, the pre-positioning receiver may emulate a file transfer protocol server, a hypertext transfer protocol server, and/or a file system server.

BRIEF DESCRIPTION OF THE DRAWINGS

FIG. 7A and FIG. 7B illustrate a message sequence chart for the network memory system where a portion of the response to the data request is locally accessible to the branch appliance, in an exemplary implementation of the invention;

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

To provide improved application performance and data access, the network memory system generally comprises a first appliance and a second appliance. The first appliance receives data and determines whether a portion of the data is locally accessible to the second appliance. The first appliance generates an instruction based on the determination and transfers the instruction to the second appliance through the communication network.

The network memory system provides that the second appliance processes the instruction to obtain the data and transfers the data to a computer. The data may be locally accessible to the second appliance, and the transfer to the computer may occur faster than transferring the data over the communication network. Accordingly, the second appliance transfers the data to computer without the first appliance transferring the data over the communication network that may have a high latency and low bandwidth. Thus, the network memory system operates to reduce latency and network traffic over the communication network.

Figure 1:
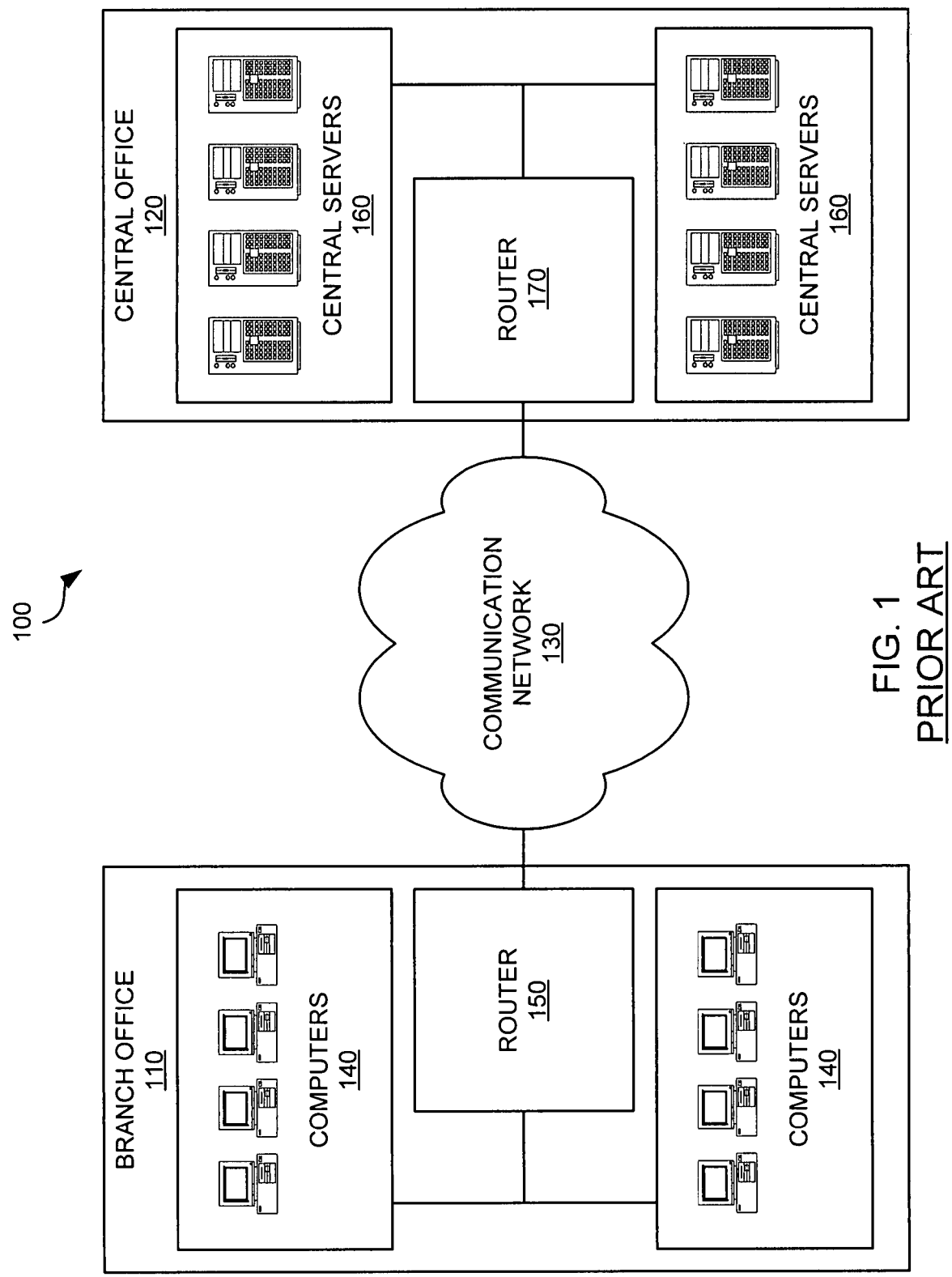
FIG. 1 illustrates a centralized server system in the prior art.
Figure 2:
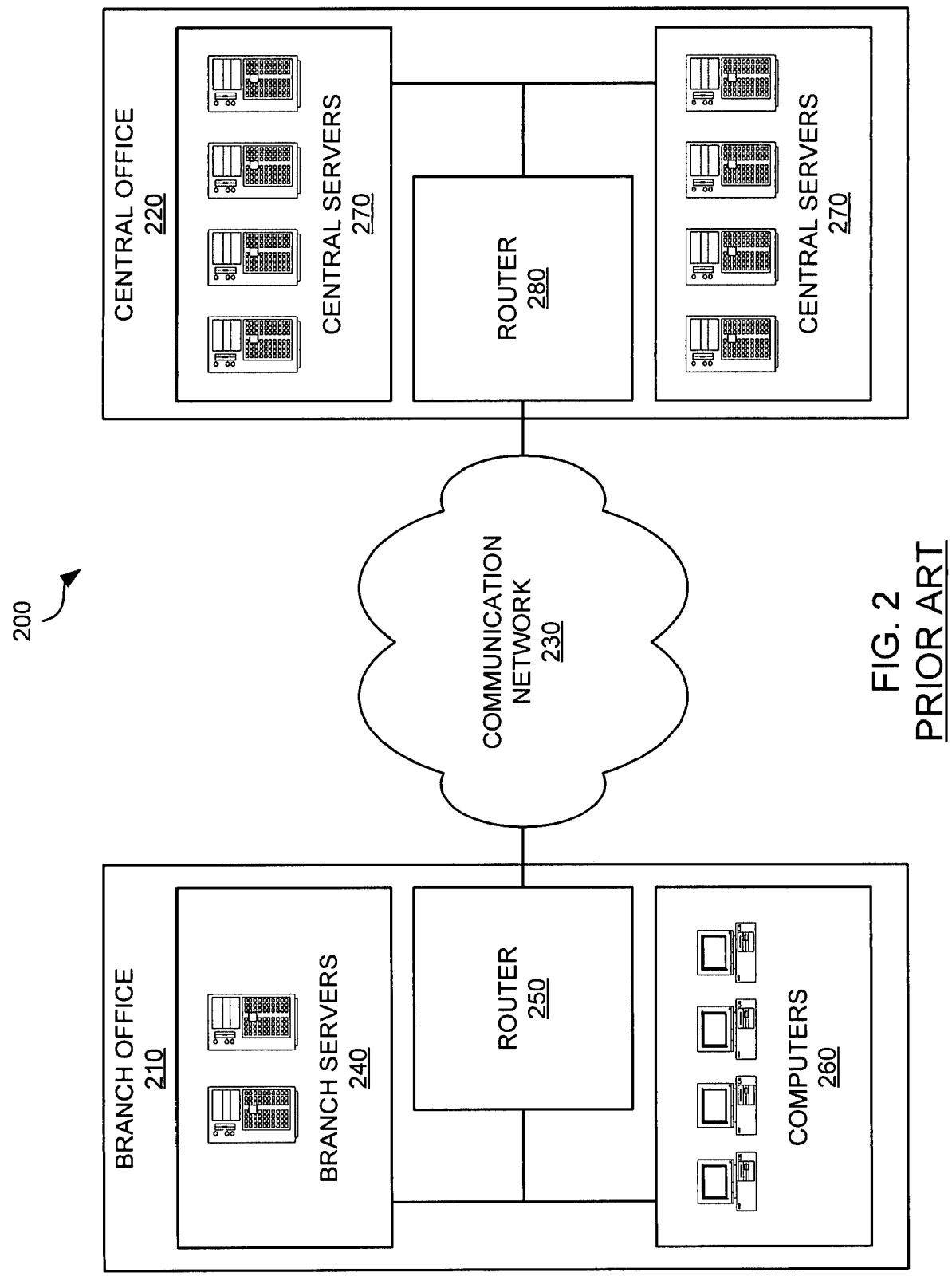
FIG. 2 illustrates a distributed server system in the prior art.
Figure 3:
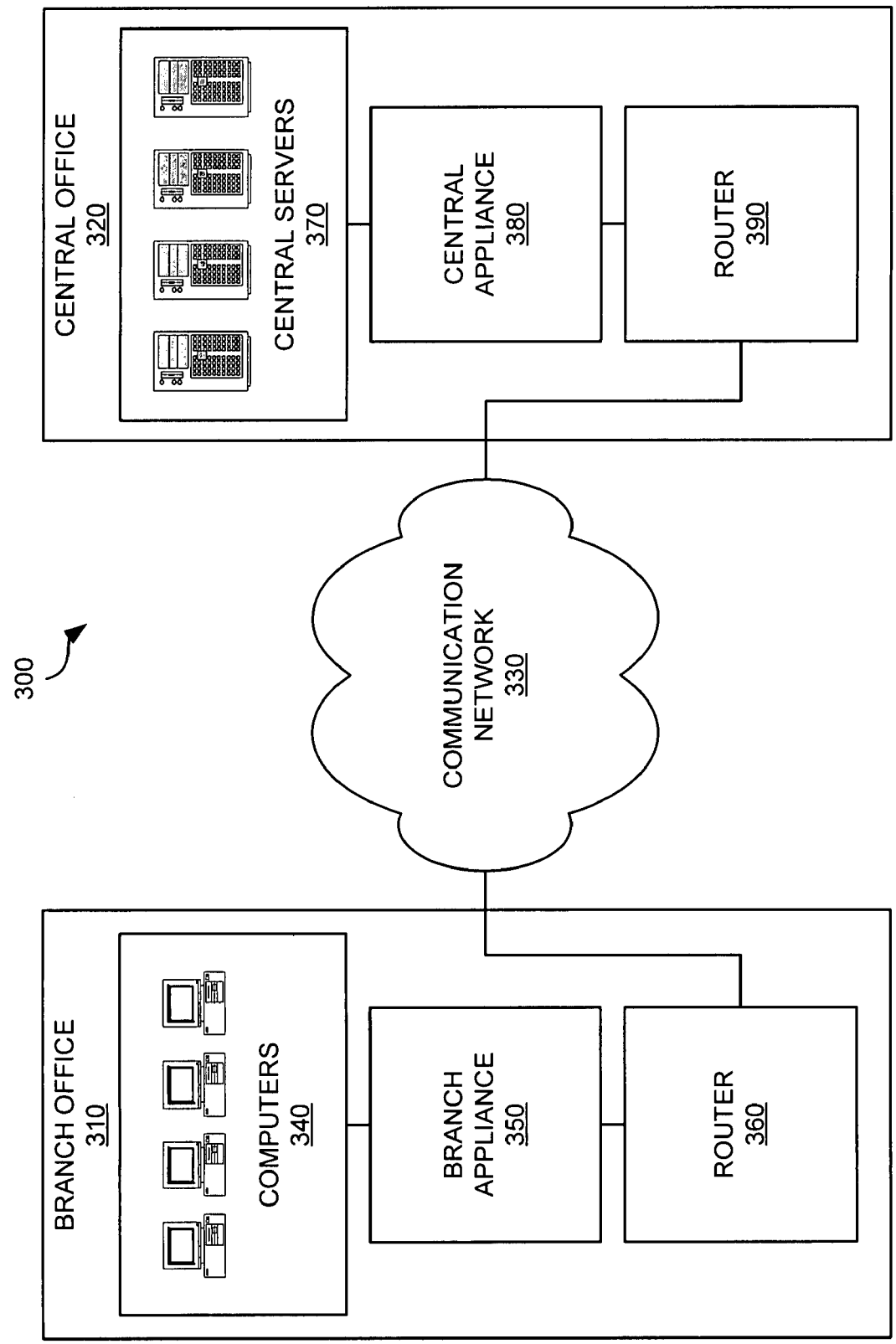
FIG. 3 illustrates a network memory system, in an exemplary implementation of the invention.

FIG. 3 illustrates a network memory system 300, in an exemplary implementation of the invention. The network memory system 300 includes a branch office 310, a central office 320, and a communication network 330. The branch office 310 includes computers 340, a branch appliance 350, and a router 360. The central office 320 includes central servers 370, a central appliance 380, and a router 390.

In the branch office 310, the computers 340 are linked to the branch appliance 350. The branch appliance 350 is linked to the router 360. The router 360 is coupled to the communication network 330. In the central office 320, the central servers 370 are linked to the central appliance 380. The central appliance 380 is linked to the router 390. The router 390 is coupled to the communication network 330.

The principles discussed herein are equally applicable to multiple branch offices (not shown) and to multiple central offices (not shown). For example, the network memory system 300 may include multiple branch offices and/or multiple central offices coupled to the communication network 330. Branch office/branch office communication and central office/central office communication, as well as multi-appliance and/or multi-node communication and bi-directional communication are further within the scope of the disclosure. However, for the sake of simplicity, the disclosure illustrates the network memory system 300 having the single branch office 310 and the single central office 320, and the respective branch office 310/central office 320 communication.

The communication network 330 comprises hardware and/or software elements that enable the exchange of information (e.g., voice and data) between the branch office 310 and the central office 320. Some examples of the communication network 330 are a private wide-area network (WAN), and the Internet. Typically connections from the branch office 310 to the communication network 330 (e.g., from the router 360 and the router 390) are ISDN, T1 lines (1.544 Mbps), and possibly broadband connections such as digital subscriber lines (DSL) and cable modems. Other examples are T3 lines (43.232 Mbps), OC3 (155 Mbps), and OC48 (2.5 Gbps), although more costly and more likely used for interconnection at the central office 320 or as the backbone of the communication network 330.

The branch appliance 350 comprises hardware and/or software elements configured to receive data (e.g., email, files, and databases transactions), determine whether a portion of the data is locally accessible to an appliance (e.g., the central appliance 380), generate an instruction based on the determination, and transfer the instruction to the appliance. The branch appliance 350 also comprises hardware and/or software elements configured to receive an instruction from an appliance (e.g., the central appliance 380), process the instruction to obtain data, and transfer the data to a computer (e.g., the computers 340). One example of the branch appliance 350 is described below with respect to FIG. 8. The operations of the branch appliance 350 are discussed in further detail below in FIGS. 4, 5, 6, and 7A-7B.

Locally accessible data comprises any data transferable to the computer (e.g., the computers 340 and the central servers 370) by an appliance (e.g., the branch appliance 350 and the central appliance 380) without transferring the data over the communication network 330. In some examples, the locally accessible data is stored in random access memory (RAM) in the branch appliance 350, on a hard drive in the branch appliance 350, and a combination of data stored in RAM and on one or more hard drives in the branch appliance 350. In another example, the locally accessible data is accessible by the branch appliance 350 over a communication network (other than the communication network 330), such as data stored in a network attached storage (NAS) device that is internal or external to the branch office 310. In still another example, the locally accessible data is stored in a database. The database may be stored in RAM, on a hard disk, a combination of RAM and hard disks, in a NAS device, and/or in other optical and flash storage devices.

The instruction comprises any message or signal that indicates to an appliance (e.g., the branch appliance 350 and the central appliance 380) an action to perform with the data. Some examples of the instruction indicate to the appliance to store the data, to retrieve the data, and to forward the data to the computer (e.g., the central servers 370 and the computers 340). The instruction may be explicit, and implicit based on instructions indicating to store or retrieve the data. In some embodiments, the instruction indicates an index within a database for storing and retrieving the data.

The central appliance 380 comprises hardware and/or software elements configured to receive data, determine whether a portion of the data is locally accessible to an appliance (e.g., the branch appliance 350), generate an instruction based on the determination, and transfer the instruction to the appliance. The central appliance 380 also comprises hardware and/or software elements configured to receive an instruction from an appliance (e.g., the branch appliance 350), process the instruction to obtain the data, and transfer the data to a computer (e.g., the central servers 370). One example of the central appliance 380 is described below with respect to FIG. 9. The operations of the central appliance 380 are discussed in further detail below in FIGS. 4, 5, 6, and 7A-7B.

As illustrated, the branch appliance 350 is configured in-line (or serially) between the computers 340 and the router 360. The central appliance 380 is also configured serially between the central server 370 and the router 390. The branch appliance 350 and the central appliance 380 transparently intercept network traffic between the computers 340 and the central servers 370. For example, the central appliance 380 transparently intercepts data sent from the central servers 370 and addressed to the computers 340. The computers 340 and the central servers 370 advantageously require no additional configuration because the branch appliance 350 and the central appliance 380 operate transparently.

Alternatively, the branch appliance 350 and the central appliance 380 are configured as an additional router or gateway. As a router, for example, the branch appliance 350 appears to the computers 340 as an extra hop before the router 360. In some embodiments, the branch appliance 350 and the central appliance 380 provide redundant routing or peer routing with the router 360 and the router 390. Additionally, in the bridge and router configurations, the branch appliance 350 and the central appliance 380 provide failure mechanisms, such as, fail-to-open (e.g., no data access) or fail-to-wire (e.g., a direct connection to the router 360).

It will be understood that the branch appliance 350 and the central appliance 380 perform bi-directional communication. For example, data sent to the branch appliance 350 from the central appliance 380 may be stored in a location locally accessible to the central appliance 380 and in a location locally accessible to the branch appliance 350. If the data is to be transferred again from the central appliance 380 to the branch appliance 350, the central appliance 380 may determine that the data is locally accessible to the branch appliance 350 and generate an instruction to the branch appliance 350 to retrieve the data. The central appliance 380 transfers the instruction to the branch appliance 350 and the branch appliance 350 processes the instruction to obtain the data. If later, the branch appliance 350 is to transfer the entire data back to the central appliance 380, the branch appliance 350 may use the fact that the central appliance 380 has before transferred the data to the branch appliance 350. The branch appliance 350 therefore determines that the data is locally accessible to the central appliance 380 and generates an instruction to the central appliance 380 to retrieve the data. The branch appliance 350 transmits the instruction to the central appliance 380 and the central appliance 380 processes the instruction to obtain the data. Therefore, an appliance (e.g., the branch appliance 350 and the central appliance 380) in the network memory system 300 advantageously uses data transferred to and from the appliance to reduce network traffic with other appliances in the network memory system 300.

The network memory system 300 advantageously provides increased productivity, reduced IT costs, and enhanced data integrity and compliance. For example, the network memory system 300 achieves the simple administration of centralized server systems whereby the central servers 370 store the primary copy of the data. The network memory system 300 improves application performance and data access in the branch office 310 and central office 320 because not every response to a data request travels over the communication network 330 from the central servers 370. The branch appliance 350 and the central appliance 380 also store to and retrieve from a local copy of the data for subsequent exchanges of the data.

Additionally, the network memory system 300 does not cache the data in the traditional sense. The data may be retrieved locally even if the URL or filename for the data is different because the data may be identified by a pattern for the data itself and not by the URL or filename. Furthermore, unlike web caching, the network memory system 300 ensures that the data is coherent by forwarding messages (e.g., data requests and responses) between the computers 340 and the central servers 370. For example, web caching operates by locally intercepting messages for an authoritative source (e.g., a web server) and responding to the messages such that the web server potentially never sees the messages. In some cases, particularly with dynamic content, the locally cached copy may be stale or out-of-date. Advantageously, the network memory system 300 provides the data coherency and up-to-date data by the transparent operation of the network memory system 300 and the principle in which messages are transferred end-to-end (e.g., from the computer 340 to the central servers 370), even though the messages and/or the data may not traverse the communication network 330.

The network memory system 300 does not have the higher cost of distributed server systems because the branch appliance 350 and the central appliance 380 provide benefits across all applications and displace several distributed devices and caches, particularly in multiple branch implementations. In some embodiments, the branch appliance 350 and the central appliance 380 provide internal storage for a secondary copy of the data. The network memory system 300 also reduces the hardware and license costs for the branch office 310 and the central office 320 by eliminating the need for the numerous distributed devices. Further, the network memory system 300 minimizes the security vulnerabilities and patching activities commonly associated with the distributed systems. Management of the branch appliance 350 and the central appliance 380 is simpler than the management of a remote distributed server. Unlike remote servers, there is no need to configure user accounts, permissions, and authentication schemes on the branch appliance 350 and the central appliance 380.

Figure 4:
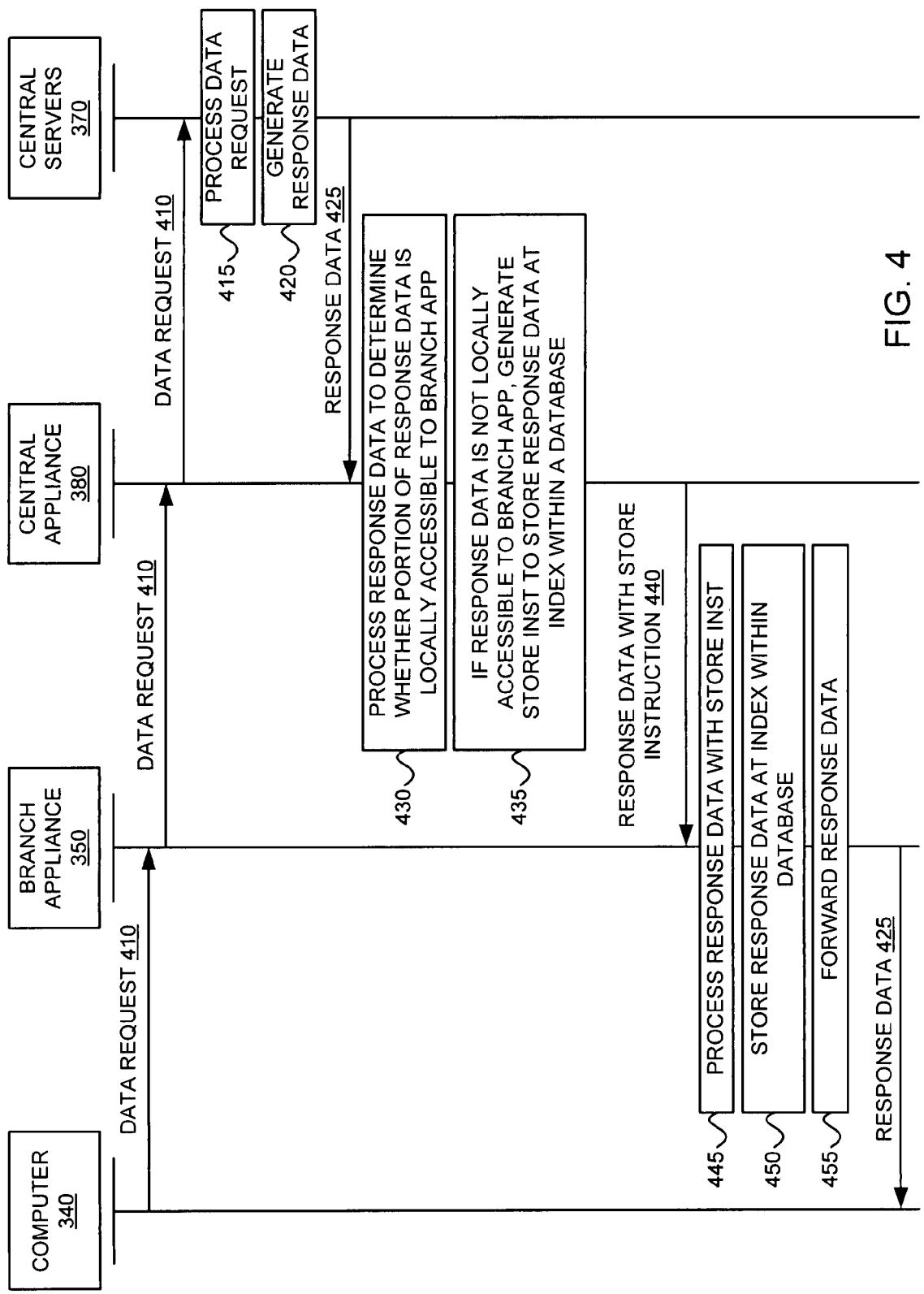
FIG. 4 illustrates a message sequence chart for the network memory system where a response to a data request is not locally accessible to a branch appliance, in an exemplary implementation of the invention.

FIG. 4 illustrates a message sequence chart for the network memory system 300 where a response data 425 to a data request 410 is not locally accessible to the branch appliance 350, in an exemplary implementation of the invention. In this example, the computer 340 transmits the data request 410 through the branch appliance 350 and the central appliance 380 to the central server 370. Some examples of the data request 410 are requests for an email attachment, a file, a web page, and a database query.

In sequence 415, the central servers 370 process the data request 410, and in sequence 420, the central servers 370 generate the response data 425 based on the data request 410. Some examples of the response data 425 are an email message and attachment, a file, a web page, and results retrieved or obtained from the database query. The central servers 370 then transmit the response data 425 to the central appliance 380. Alternatively, in some embodiments, the central server 370 addresses the response data 425 directly to the computer 340, however, during transmission, the central appliance 380 transparently intercepts the response data 425. In sequence 430, the central appliance 380 processes the response data 425 to determine whether a portion of the response data 425 is locally accessible to the branch appliance 350.

Figure 5:
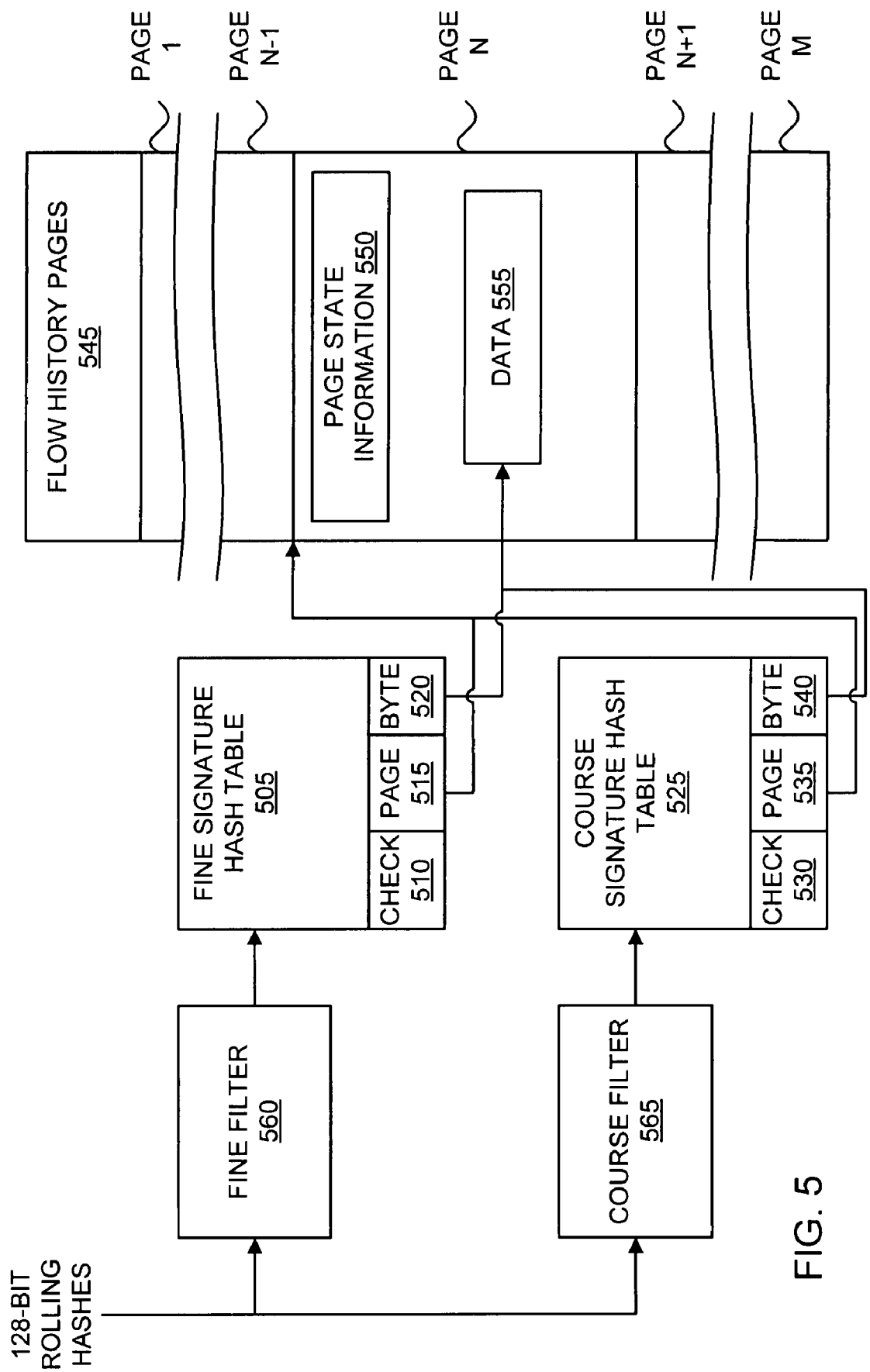
FIG. 5 illustrates data structures for the network memory system to determine whether a portion of the data is locally accessible to the branch appliance, in an exemplary implementation of the invention.

FIG. 5 illustrates data structures for the network memory system 300 to determine whether a portion of the data is locally accessible to the branch appliance 350, in an exemplary implementation of the invention. The data structures include a fine signature hash table (SHT) 505, a coarse signature hash table (SHT) 525, and flow history pages (FHPs) 545. The fine SHT 505 includes one or more entries comprising a check field 510, a page field 515, and a byte field 520. The coarse SHT 525 includes one or more entries comprising a check field 530, a page field 535, and a byte field 540. The FHPs 545 include one or more pages (e.g., page 1-M). Each page (e.g., page N) includes page state information 550 and stores data 555.

An appliance of the network memory system 300 (e.g., the branch appliance 350 and the central appliance 380) calculates hashes at every byte boundary of a data flow (e.g., the response data 425) to be sent across the communication network 330. In some embodiments, the data flow includes packets that are in the same Internet Protocol (IP) flow, as defined by the IP header five tuple of source address, source port, destination address, destination port, and protocol. The hashes may be influenced by preceding bytes in the data flow. For example, the hashes are influenced by approximately the n previous bytes, where n determines the fingerprint size. Some examples of calculating the hashes are cyclical redundancy checks (CRCs) and checksums over the previous n bytes of the data flow. In some embodiments, rolling implementations of CRCs and checksums are used where a new byte is added, and a byte from n bytes earlier is removed. To maximize the ability to determine whether a portion of the data flow exists in another appliance in the network memory system 300, the hash calculation may span across successive IP packets in the data flow. In other embodiments, the hash calculation ignores patterns that span one or more IP packet boundaries in the data flow, and the hashes are calculated within a single IP packet.

Each calculated hash is filtered by a fine filter 560 and a coarse filter 565. The appliance designates the locations in the data flow which meet the fine and coarse filter criteria as fine and coarse sync-points, respectively. The fine filter 560 and the coarse filter 565 have different filter criteria. Typically, the filter criteria for the coarse filter 560 is more restrictive and may be used to further filter those hashes which pass the fine filter. In other words, the fine filter produces a fine comb of sync-points and the coarse filter produces a coarse comb of sync-points. One example of the filter criteria is the null filter which allows results in sync-points at all locations. In another example, the filter criteria declares a fine sync-point when the top five bits of the hashes are all zeros and a coarse filter criteria which stores or compares hashes when the top ten bits of the hashes are all zeros. The hash at the fine sync-points index the fine SHT 505 and the hash at the coarse sync-points index the coarse SHT 525. For example, the index could be derived from the hash by using a number of low order bits from the hash. The filter criteria affect the sizing of the SHTs 505 and 525 and the probability of matching a hash in the SHTs 505 and 525. The more sync-points that are generated the easier repeated data is identified but, the larger the tables (i.e., the SHTs 505 and 525) need to be in order to index a given amount of information for the data flow. Having a coarse and fine table helps optimize this tradeoff. Alternative implementations may use a single table or multiple tables.

The fine SHT 505 is populated with hashes as the data 555 (e.g., the response data 425) is stored and when the data 555 is recalled from disk or other locally accessible storage. The fine SHT 505 finely indexes the data 555. In some embodiments, the fine SHT 505 holds approximately one entry for every 100 bytes of the data 555. The coarse SHT 525 is populated as the data 555 is stored and is coarsely indexed. For example, the coarse SHT 525 may hold one entry for approximately every 4 kilobytes (KB) of the data 555. The fine SHT 505 and the coarse SHT 525 may be considered short term and long term memory index structures, respectively.

The appliance of the network memory system 300 stores all or part of the calculated hashes in or compares all or part of the hashes to the check field 510 in the SHTs 505 and 525. For example, the central appliance 380 verifies a "hit" in the fine SHT 505 by comparing the entire calculated hash or a number of residual bits of the calculated hash to the check field 510. If the central appliance 380 finds no matching hashes in the fine SHT 505 or in the coarse SHT 525, the central appliance 380 determines that the response data 425 is not locally accessible to the branch appliance 350. Each calculated hash for the response data 425 in the fine SHT 505 and the coarse SHT 525 is stored or compared depending on the filter criteria for the fine filter 560 and the coarse filter 565.

The appliance of the network memory system 300 indexes each entry in the fine SHT 505 and the coarse SHT 525 to a page (e.g., by setting the page field 515 and the page field 535 to address page N) and byte offset (e.g., by setting the byte field 520 and the byte field 540 to a byte offset of the data 555) in the FHPs 545. For example, the central appliance 380 stores the response data 425 in the FHPs 545 at the page pointed to by the page field 515 and 535 at the byte offset indicated by the byte field 520 and 540. The byte field 520 of each hash in the fine SHT 505 for the response data 425 points to the start of a fine sync-point. The byte field 540 of each hash in the coarse SHT 525 for the response data 425 points to the start of a coarse sync-point.

In this example, the branch appliance 350 includes a fine SHT 505, a coarse filter 525, and a FHP 545 data structure, and the central appliance 380 includes a fine SHT 505, a coarse filter 525, and a FHP 545 data structure. Each appliance in the network memory system 300 maintains the separate data structures, with may include separate filter criteria for the fine filters 560 and the coarse filters 565. The page state information 550, in the FHP 545 of each appliance in the network memory system 300, includes page parameters, page ownership permissions, peer state, and a list of valid byte ranges for each appliance in the network memory system 300. The page state information 550 tracks the local state of the page (e.g., the FHP 545 in the branch appliance 350, and what parts of the page are used) and the remote state of the page at peers (e.g., the central appliance 380, and what part of the page in the branch appliance 350 is used by the central appliance 380).

The branch appliance 350 and the central appliance 380 each write the data 555 to an assigned page (e.g., the page N or the page N+1) and may reference a page assigned to another appliance in the network memory system 300. Appliances in the network memory system 300 may discover and reconcile the FHPs 545 assigned to other appliances as explained below with regard to FIGS. 9 and 10.

Referring again to FIG. 4, the central appliance 380 proceeds with the determination that no portion of the response data 425 is locally accessible to the branch appliance 350. In sequence 435, the central appliance 380 generates a store instruction 440. The store instruction 440 indicates to the branch appliance 350 to store the response data 425 at an index in a database. The central appliance 380 attaches the store instruction 440 to the response data 425. The central appliance 380 then transmits the response data 425 with the store instruction 440 to the branch appliance 350.

In sequence 445, the branch appliance 350 processes the response data 725 with the store instruction 440. In sequence 450, based on the store instruction 440, the branch appliance 350 stores the response data 425 in the branch appliance 350 at the index within the database. In this example, the branch appliance 350 stores the response data 425 in the FHPs 545 at the page and at a particular byte offset indicated by the index. In sequence 455, the branch appliance 350 forwards the response data 425 to the computer 340. As discussed previously, the branch appliance 350 may forward the data to the computer based on explicit and implicit instructions.

Figure 6:
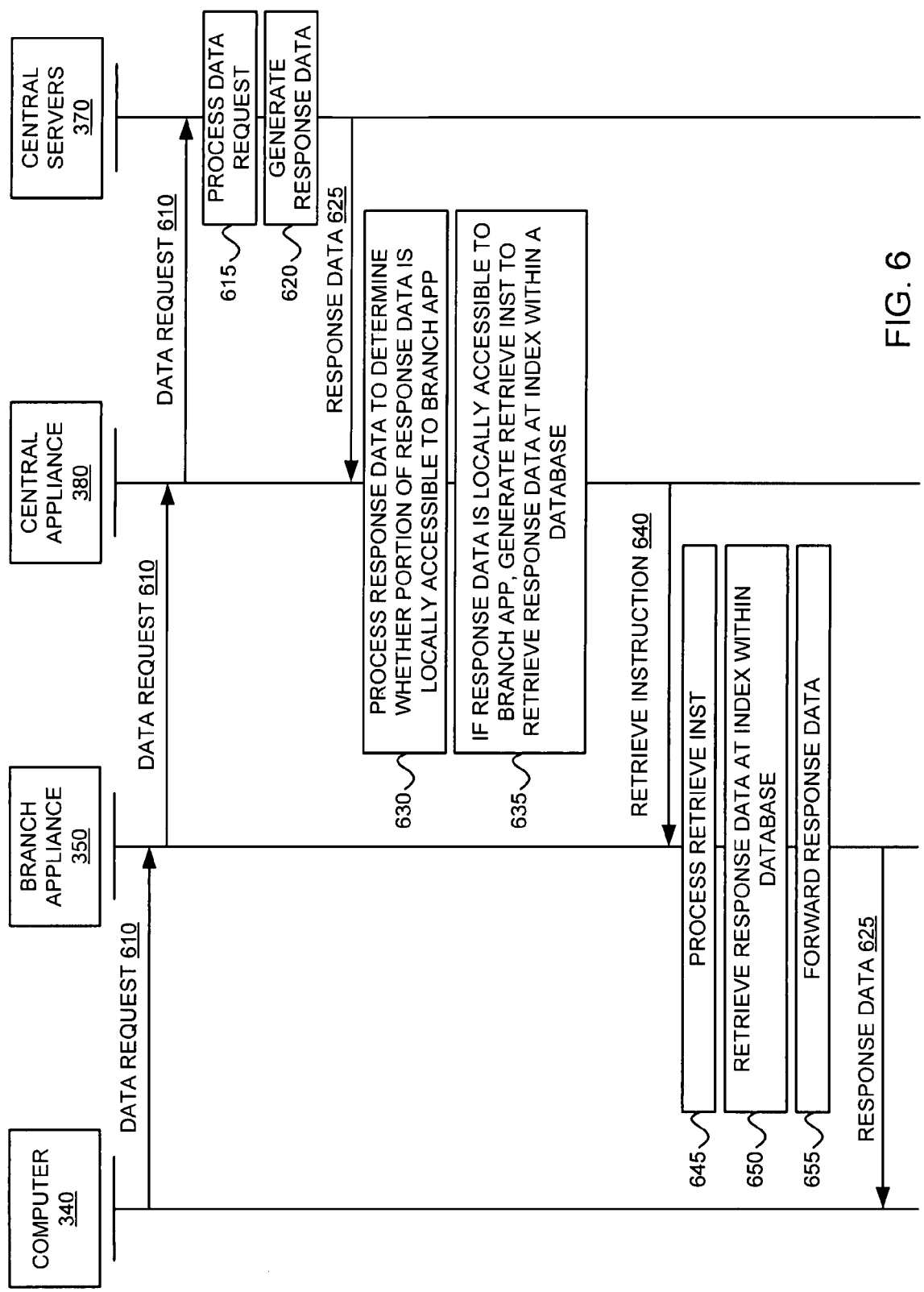
FIG. 6 illustrates a message sequence chart for the network memory system where the response to the data request is locally accessible to the branch appliance, in an exemplary implementation of the invention.

FIG. 6 illustrates a message sequence chart for the network memory system 300 where a response data 625 to a data request 610 is locally accessible to the branch appliance 350, in an exemplary implementation of the invention. In this example, the computer 340 transmits the data request 610 to the central servers 370 through the branch appliance 350 and the central appliance 380. In sequence 615, the central servers 370 process the data request 610. In sequence 620, the central servers 370 generate a response data 625 based on the data request 610. The central servers 370 then transmit the response data 625 to the central appliance 380.

In sequence 630, the central appliance 380 processes the response data 625 to determine whether a portion of the response data 625 is locally accessible to the branch appliance 350. The central appliance 380 again generates hashes for the response data 625, as previously described with respect to FIGS. 4 and 5. The central appliance 380 filters the generated hashes through the fine filter 560 and the coarse filter 565 to determine fine and/or coarse sync-points. The central appliance 380 looks up the fine sync-points in the fine SHT 505 and the coarse sync-points in the coarse SHT 525. If any of the hashes for the response data 625 match (i.e., the check bytes match in either the fine SHT 505 and/or the coarse SHT 525), then additional checks (such as direct forward comparisons and backward memory comparisons between the response data 625 and the data 555 in the FHPs 545) may also be made to determine the size of the matching region. Further checks using the page state information 550 determine which portion of the response data 625 is locally accessible to the branch appliance 350.

Based on the determination that the entire response data 625 is locally accessible to the branch appliance 350, in sequence 635, the central appliance 380 generates a retrieve instruction 640 that indicates to the branch appliance 350 to retrieve the response data 625 at an index within the database. The central appliance 380 then transmits only the retrieve instruction 640 to the branch appliance 350. In this manner, the central appliance 380 optimizes network traffic over the communication network 330. If the retrieve instruction 640 is smaller in size than the response data 625, the central appliance 380 transmits the retrieve instruction 640. If the retrieve instruction 640 is larger than the response data 625, the central appliance 380 transmits the response data 625 instead.

In sequence 645, the branch appliance 350 processes the retrieve instruction 640. In sequence 650, based on the retrieve instruction 640, the branch appliance 350 retrieves the response data 625 at the index within the database. In sequence 655, the branch appliance 350 forwards the response data 625 to the computer 340.

Figure 7A:
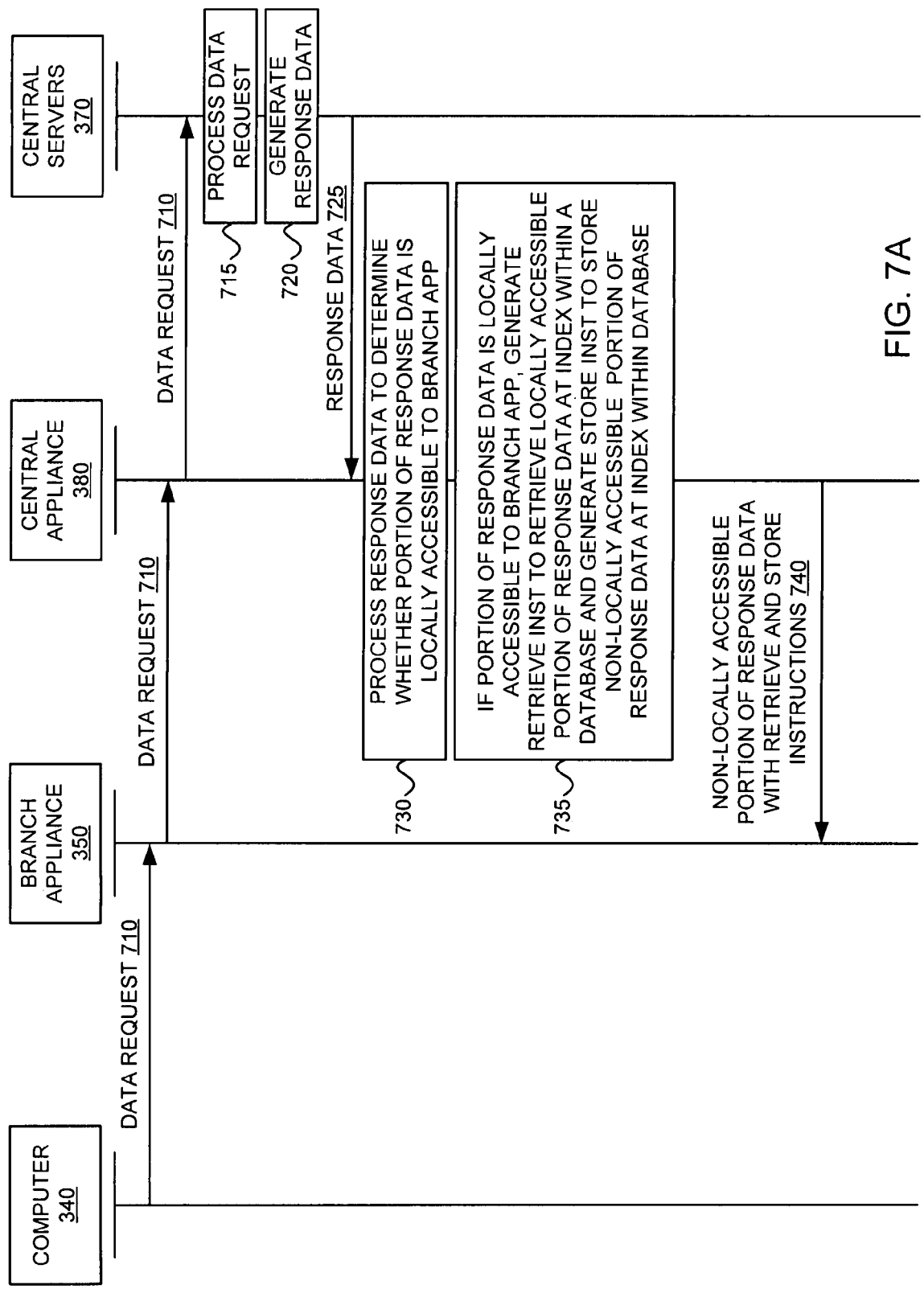

FIG. 7A and FIG. 7B illustrate a message sequence chart for the network memory system 300 where a portion of a response data 725 to a data request 710 is locally accessible to the branch appliance 350, in an exemplary implementation of the invention. The computer 340 transmits the data request 710 to the central servers 370 through the branch appliance 350 and the central appliance 380. In sequence 715, the central servers 370 process the data request 710. In sequence 720, the central servers 370 generate a response data 725 based on the data request 710. The central servers 370 then transmit the response data 725 to the central appliance 380.

In sequence 730, the central appliance 380 processes the response data 725 to determine whether a portion of the response data 725 is locally accessible to the branch appliance 350. The central appliance 380 computes hashes for the response data 725 and filters the hashes through the fine filter 560 and the coarse filter 565 to determine any fine and coarse sync-points. The central appliance 380 then looks up any fine sync-points in the fine SHT 505 and coarse sync-points in the coarse SHT 525. In this example, only a portion of the response data 725 is locally accessible to the branch appliance 350, meaning that although the central appliance 380 finds at least one match in the SHTs 505 and 525, additional checks (such as the direct forward comparison and the backward memory comparison with the response data 725 and the data 555) determine that only a portion of the response data 725 is locally accessible to the branch appliance 350.

The central appliance 380 stores the generated hashes for the non-locally accessible portion of the response data 725 (otherwise known as the deltas) in the SHTs 505 and 525, and stores the deltas in the FHPs 545. The central appliance 380 will transmit the deltas (i.e., the portion of the response data 725 that is not locally accessible) to the branch appliance 350.

In sequence 735, the central appliance 380 generates retrieve and store instructions 740. The retrieve instruction indicates to the branch appliance 350 to retrieve the locally accessible portion of the response data 725 at an index within the database. The store instruction indicates to the branch appliance 350 to store the deltas at an index within the database. The store instruction may also indicate to the branch appliance 350 to store another copy of the portion of the response data 725 locally accessible to the branch appliance 350 with the deltas. The entire response data 725 will then be locally accessible in the database to the branch appliance 350. The central appliance 380 attaches the deltas to the retrieve and store instructions 740. The central appliance 380 then transmits the non-locally accessible portion of the response data 725 with retrieve and store instructions 740 to the branch appliance 350.

In sequence 745, the branch appliance 350 processes the non-locally accessible portion of the response data 725 with retrieve and store instructions 740. In sequence 750, based on the retrieve instruction, the branch appliance 350 retrieves the locally accessible portion of the response data 725 at the index in the database. In sequence 755, the branch appliance 350 obtains the response data 725 from the retrieved locally accessible portion and the transferred deltas (i.e., the transferred non-locally accessible portion of the response data 725). In sequence 760, based on the store instruction, the branch appliance 350 stores the deltas (and potentially the retrieve locally accessible portion of the response data 725) at the index in the database. In sequence 765, the branch appliance 350 transmits the entire response data 725 to the computer 340.

Alternatively, in addition to the examples in FIGS. 4, 5, 6, and 7A-7B illustrating a request for the data originating from the computer 340 to the central servers 370, the computer 340 may also transmit data to the branch appliance 350 addressed to the central servers 370. The branch appliance 350 determines whether a portion of the data is locally accessible to the central appliance 380. Then, for example, if the data is locally accessible the central appliance 380, the branch appliance 350 generates a retrieve instruction indicating to the central appliance 380 to retrieve the data and forward the data to the central server 370.

In still further embodiments, the instruction may indicate a plurality of indexes. Referring again to FIG. 7B, in sequence 750, based on the retrieve instruction indicating a plurality of indexes for the response data 725, the branch appliance 350 may retrieve the locally accessible portion of the response data 725 at different locations based on the plurality of index. For example, the branch appliance 350 may retrieve a portion of the response data 725 from RAM, a portion from a hard disk, and a portion from a NAS device. Similarly, in sequence 760, based on the store instruction indicating a plurality of indexes for the response data 725, the branch appliance 350 may stores the deltas in the database and after obtaining the entire response data 725, store the entire response data 725 in a different location (e.g., in a different location in the database, in a disk drive, or in a NAS device) than the previously locally accessible portion.

Figure 8:
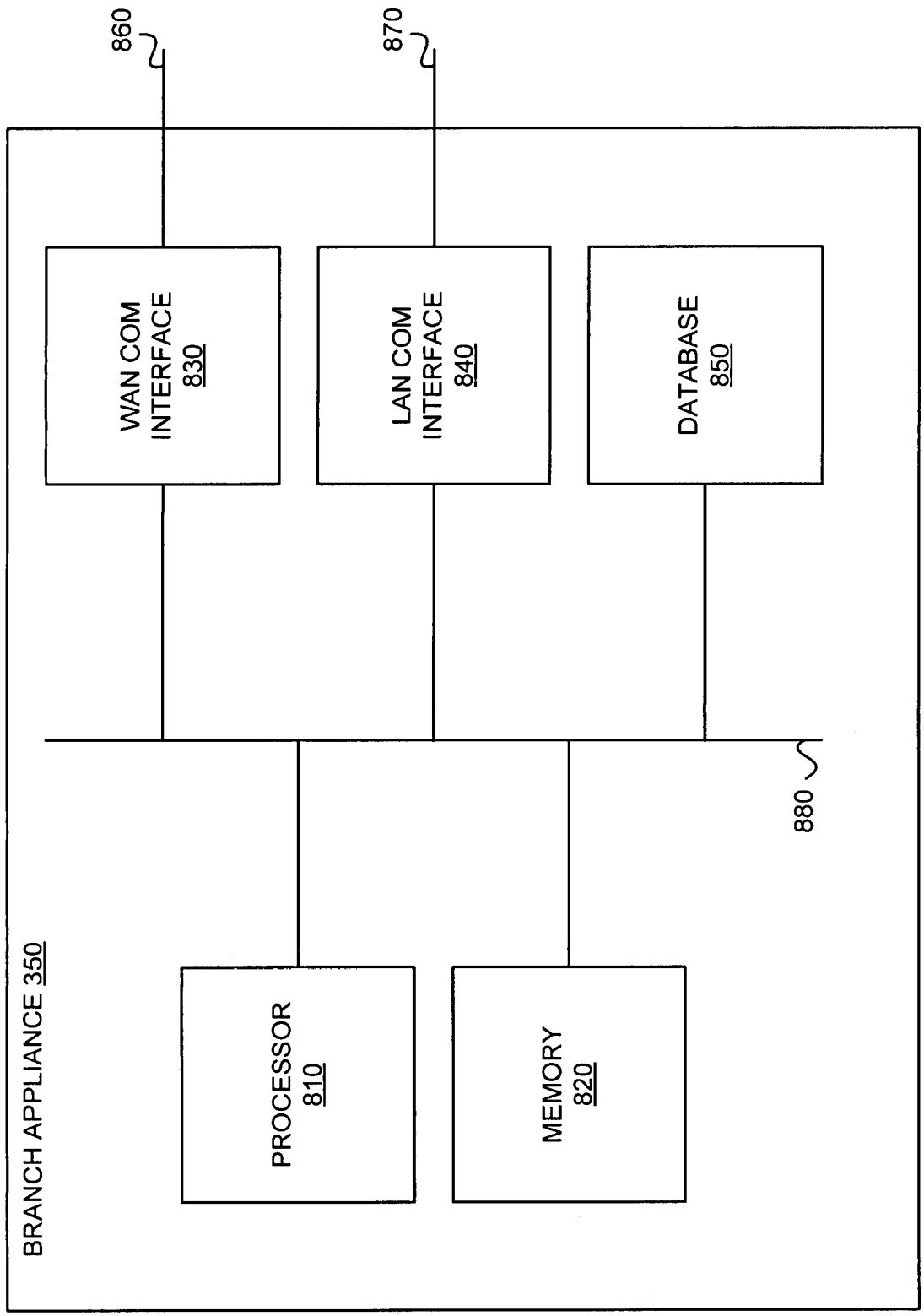
FIG. 8 illustrates a block diagram of the branch appliance, in an exemplary implementation of the invention.

FIG. 8 illustrates a block diagram of the branch appliance 350, in an exemplary implementation of the invention. The branch appliance 350 includes a processor 810, a memory 820, a WAN communication interface 830, a LAN communication interface 840, and a database 850. A system bus 880 links the processor 810, the memory 820, the WAN communication interface 830, the LAN communication interface 840, and the database 850. Line 860 links the WAN communication interface 830 to the router 360 (in FIG. 3). Line 870 links the LAN communication interface 840 to the computers 340 (in FIG. 3).

The database 850 comprises hardware and/or software elements configured to store data in an organized format to allow the processor 810 to create, modify, and retrieve the data. The database 850 may organize the data to enable the determination of whether a portion of the data is locally accessible to an appliance, and to enable quick retrieval of locally accessible data to the branch appliance 350. The hardware and/or software elements of the database 850 may include storage devices, such as RAM, hard drives, optical drives, flash memory, and magnetic tape. In some embodiments, the branch appliance 350 implements a virtual memory system with linear addresses, the locally accessible data, and the data structures discussed with respect to FIG. 5 in the database 850.

Figure 9:
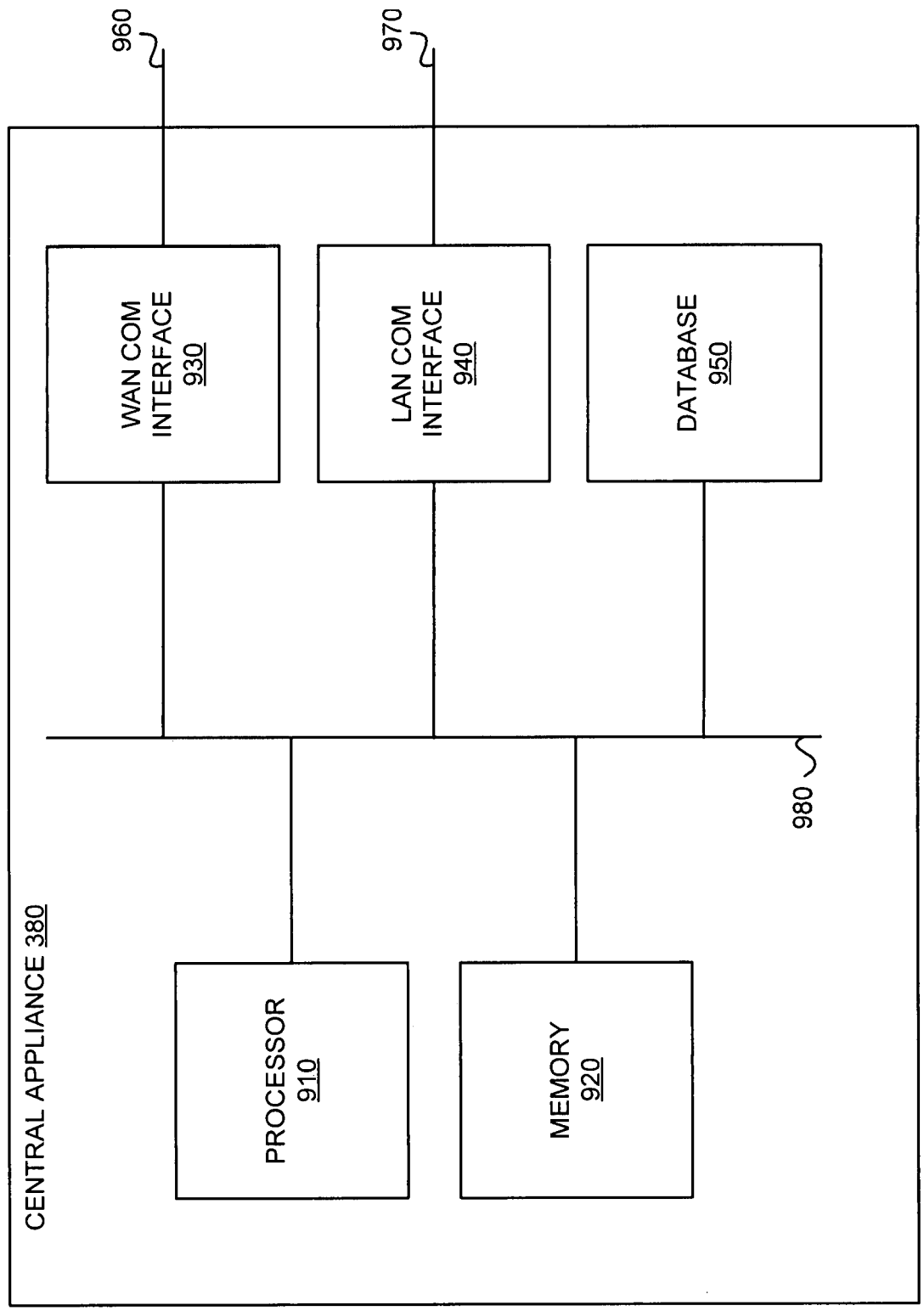
FIG. 9 illustrates a block diagram of a central appliance, in an exemplary implementation of the invention.

FIG. 9 illustrates a block diagram of the central appliance 380, in an exemplary implementation of the invention. The central appliance 380 includes a processor 910, a memory 920, a WAN communication interface 930, a LAN communication interface 940, and a database 950. A system bus 980 links the processor 910, the memory 920, the WAN communication interface 930, the LAN communication interface 940, and the database 950. Line 960 links the WAN communication interface 930 to the router 390 (in FIG. 3). Line 970 links the LAN communication interface 940 to the central servers 370 (in FIG. 3). In some embodiments, the branch appliance 350 and the central appliance 380 comprise the identical hardware and/or software elements. Alternatively, in other embodiments, the central appliance 380 may include hardware and/or software elements providing additionally processing, communication, and storage capacity.

Advantageously, the network memory system 300 improves application performance and data access. In some embodiments, by storing a secondary copy of the data locally accessible to the branch appliance 350 and the central appliance 380, the network memory system 300 minimizes the effects of latency and reduces network traffic over the communication network 330 to the central servers 370. Additionally, while the central servers 370 maintain the primary copy of the data, the central servers 370 potentially do not transfer the actual data over the communication network 330 for every request/response. Furthermore, accelerated access to the data locally accessible to the branch appliance 350 and the central appliance 380 is not limited to a particular application or data context.

In some embodiments, the network memory system 300 includes a secure tunnel between the branch appliance 350 and the central appliance 380. The secure tunnel provides encryption (e.g., IPsec) and access control lists (ACLs). Additionally, in other embodiments, the secure tunnel includes compression, such as header and payload compression. The secure tunnel may provide fragmentation/coalescing optimizations along with error detection and correction.

Figure 10:
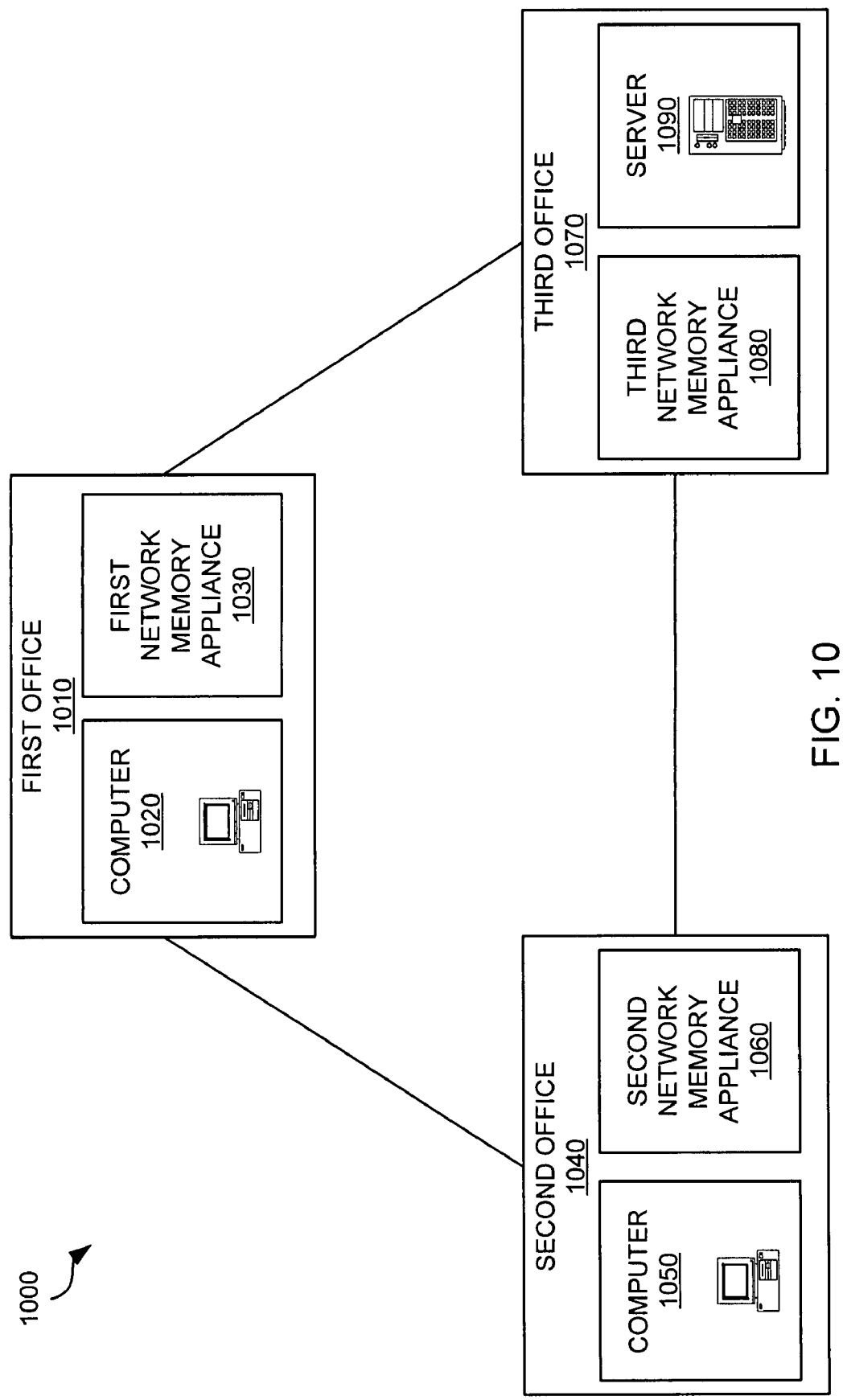
FIG. 10 illustrates a network memory system between a first office, a second office, and a third office, in an exemplary implementation of the invention.

FIG. 10 illustrates a network memory system 1000 between a first office 1010, a second office 1030, and a third office 1060, in an exemplary implementation of the invention. The first office 1010 includes a computer 1015 and a first network memory appliance (NMA) 1020. The second office 1030 includes a computer 1040 and a second NMA 1050. The third office 1060 includes a third NMA 1070 and a server 1080. The first office 1010 is linked to the second office 1030 and the third office 1060 (e.g., through routers not shown). The second office 1030 is also linked the third office 1060.

The first NMA 1020, the second NMA 1050, and the third NMA 1070 comprise hardware and/or software elements, similar to the branch appliance 350 and the central appliance 380, configured to receive data, determine whether the data is locally accessible to an appliance, generate an instruction based on the determination, and transfer the instruction to the appliance. The first NMA 1020, the second NMA 1050, and the third NMA 1070 also comprise hardware and/or software elements configured to receive an instruction from an appliance, process the instruction to obtain data, and transfer the data to a computer.

Advantageously, in this multi-office example, the network memory system 1000 provides for locally accessible data in each office. The first NMA 1020, the second NMA 1050, and the third NMA 1070 receive data, potentially destined for a computer and/or server in another office, and determine whether a portion of the data is locally accessible to an NMA in that office. To further enhance operation and the exchange of data between the first NMA 1020, the second NMA 1050, and the third NMA 1070, each NMA performs a discovery and reconciliation. During discovery and reconciliation the virtual memory map of the network memory system 1000 is updated. For example, each NMA updates the pages of the FHPs 545 in the NMA with references for data locally accessible in the network memory system 1000 and to which NMA the data is locally accessible.

Figure 11:
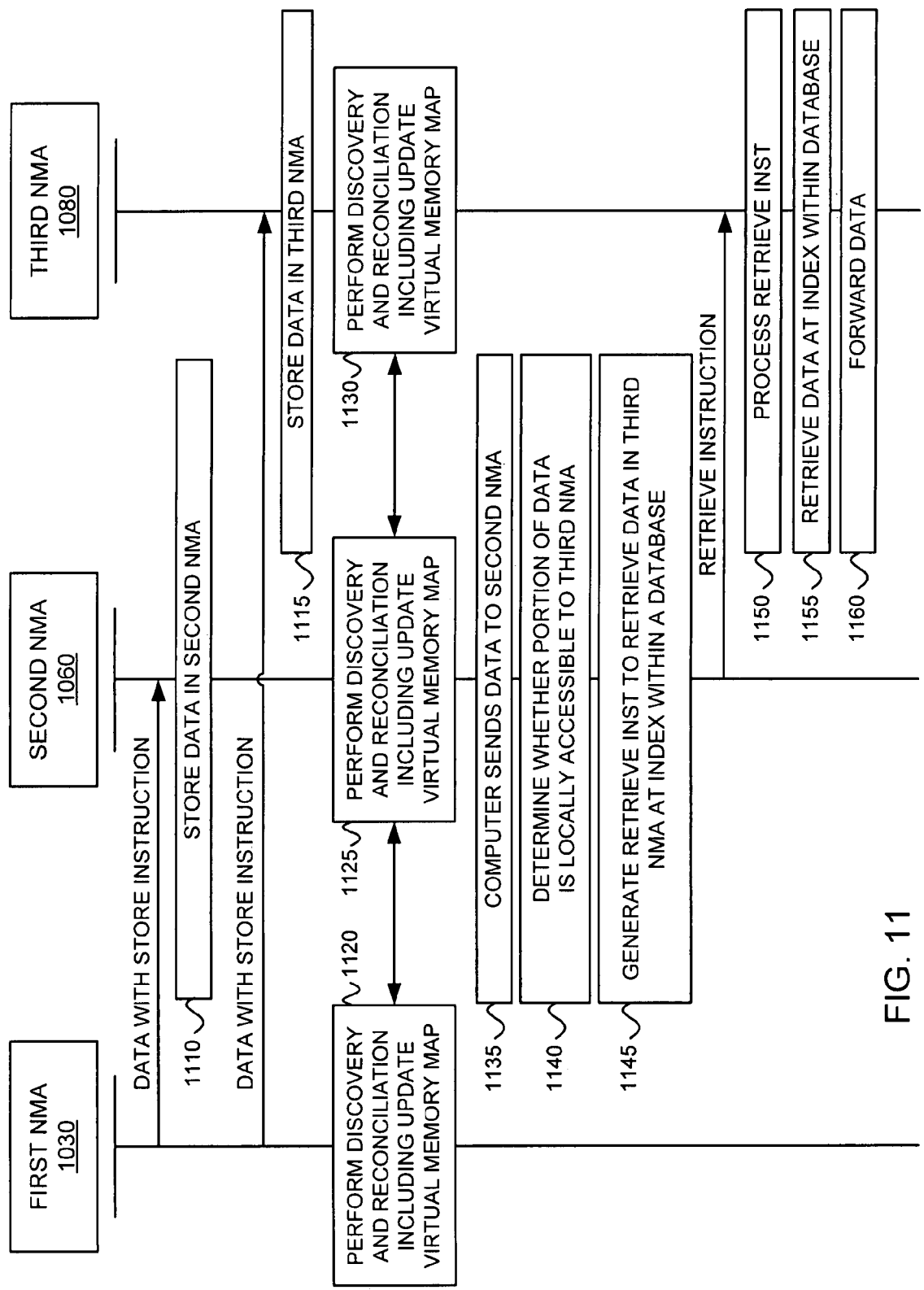
FIG. 11 illustrates a message sequence chart for the network memory system for discovery and reconciliation, in an exemplary implementation of the invention.

FIG. 11 illustrates a message sequence chart for the network memory system 1000 for discovery and reconciliation, in an exemplary implementation of the invention. In this example, the computer 1015 in the first office 1010 transmits data to the first NMA 1020 for the first time addressed to the computer 1040 in the second office 1030. The first NMA 1020 transmits the data with a store instruction to the second NMA 1050 indicating to store the data in a database in the second NMA 1050. In sequence 1110, the second NMA 1050 stores the data in the database, and the second NMA 1050 transmits the data to the computer 1040.

The computer 1015 in the first office 1010 then transmits the same data to the first NMA 1020 addressed for the first time to the server 1080 in the third office 1060. The first NMA 1020 transmits the data with a store instruction to the third NMA 1070 indicating to store the data in a database in the third NMA 1070. In the sequence 1115, the third NMA 1070 stores the data in the database, and the third NMA 1070 transmits the data to the server 1080.

In sequence 1120, 1125, and 1130, the first NMA 1020, the second NMA 1050, and the third NMA 1070 perform discovery and reconciliation including update the virtual memory map. In this example, the first NMA 1020, the second NMA 1050, and the third NMA 1070 exchange information (e.g., the page state information 550) about which parts of the FHPs 545 each NMA has available locally. For example, to update the FHPs 545 in the second NMA 1050, the second NMA 1050 performs a discovery and reconciliation with the first NMA 1020 and the third NMA 1070. Similarly, each NMA performs discovery and reconciliation with every other peer NMA.

During the discovery and reconciliation between the second NMA 1050 and the first NMA 1020, for example, the second NMA 1050 discovers from the first NMA 1020 that the data (transmitted from the computer 1015 to the computer 1040 and the server 1080) is locally accessible to the third NMA 1070. The FHPs 545 of the first NMA 1020 include references to the data (e.g., in the page state information 550) and because the first NMA 1020 transferred the data to the third NMA 1070, the FHPs 545 indicate that the data is locally accessible to the third NMA 1070. The second NMA 1050 reconciles the references for the data in the FHPs 545 and further indicates that data is locally accessible to the third NMA 1070.

Referring again to FIG. 11, in sequence 1135, after the discovery and reconciliation in sequences 1120, 1125, and 1130, the computer 1040 in the second office 1030 transmits the data addressed to the server 1080 in the third office 1060. The data is intercepted by the second NMA 1050, and in sequence 1140, the second NMA 1050 determines whether a portion of the data is locally accessible to the third NMA 1070. Since the discovery and reconciliation, the FHPs 545 in the second NMA 1050 indicates that data is locally accessible to the third NMA 1070. In sequence 1145, the second NMA 1050 generates a retrieve instruction indicating to the third NMA 1070 to retrieve the data from an index within the database. The second NMA 1050 transfers the retrieve instruction to the third NMA 1070.

In sequence 1150, the third NMA 1070 processes the retrieve instruction. In sequence 1155, based on the retrieve instruction, the third NMA 1070 retrieves the data at the index within the database. In sequence 1160, the third NMA 1070 forwards the data to the server 1080.

Therefore, the network memory system 1000 provides improved application performance and data access between the first office 1010, the second office 1030, and the third office 1060. The network memory system 1000 provides access to locally accessible data, similar to distributed servers, without the complex management involved with replication and synchronization of the data among the distributed servers. Additionally, the network memory system 1000 reduces network traffic between the offices. Furthermore, discovery and reconciliation provides performance advantages by periodically or continuously updating the FHPs 545 in each NMA.

In further embodiments, it may be desirable to store specific data at the branch appliance 350 before the data is requested at a branch office 310. For example, the first download of a software update over the communication network 330 at a branch office 310 may require several minutes. To make the first download of the software update faster, the software update may be downloaded previously to the branch appliance 350. To trigger the previous download, a pre-positioning command may be executed.

Figure 12:
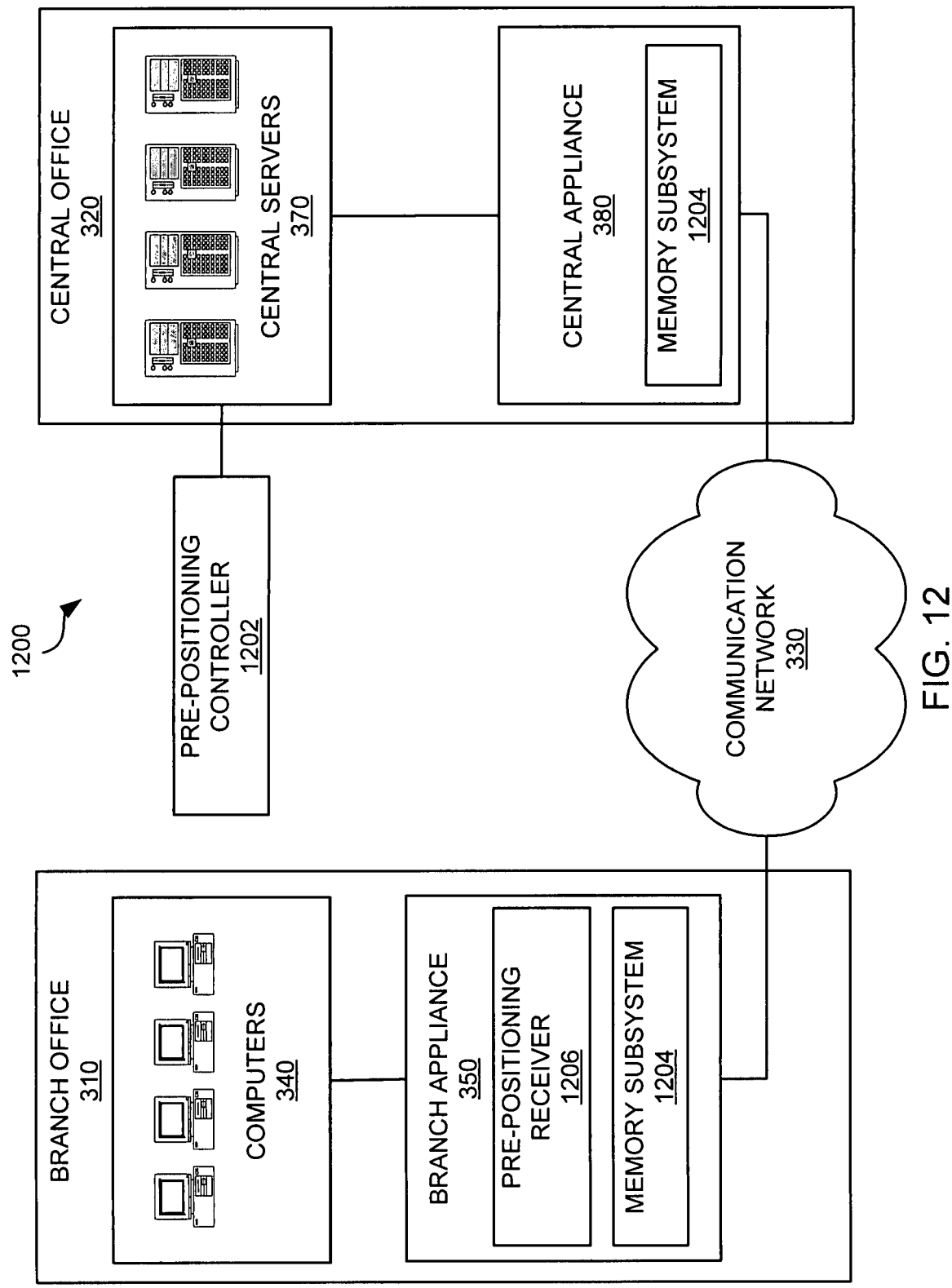
FIG. 12 depicts a diagram of an exemplary network memory system in which various embodiments of the present invention may be practiced.

FIG. 12 depicts a diagram of an exemplary network memory system 1200 in which various embodiments of the invention may be practiced. Like the network memory system 300 depicted in FIG. 3, the network memory system 1200 comprises a central office 320, a communication network 330, and a branch office 310. In the network memory system 1200, the branch appliance 350 further comprises a pre-positioning receiver 1206 and a memory subsystem 1204. Similarly, the central appliance 380 also comprises a memory subsystem 1204. According to various embodiments, the central appliance 380 may additionally comprise a pre-positioning receiver 1206. In some embodiments, the central appliance 380 and/or the memory subsystem 1204 comprises the pre-positioning controller 1202.

In exemplary embodiments, the pre-positioning controller 1202 is configured to execute a pre-positioning command. In one example, a network administrator may generate a pre-positioning command to position data at the branch appliance 350 such that the data is locally accessible at the branch office 310. The data to be pre-positioned may include, for example, software updates, frequently used files, or other data that will likely be requested at the branch office 310.

In another example, a software update for computers 340 in the branch office 310 becomes available at the central servers 370 in the central office 320. The network administrator in the central office 320 may wish to provide the update to the branch office 310 at a time when there is only a small amount of data being communicated over communication network 330, for example, at night.

When data is pre-positioned in a branch appliance 350, the data is received from the central appliance 380 and/or retrieved from the memory subsystem 1204 without a request first being received from one of the computers 340. Within the network memory system 1200, these actions store the data and/or overwrite older data according to an LRU or FIFO algorithm within the memory subsystem 1204. This results in faster retrieval of the data if it is requested by one of the computers 340. By pre-positioning the update when very little data is communicated, network performance may be enhanced when one of the computers 340 first requests the update. In various embodiments, rather than an update being pre-positioned, other types of data, including, but not limited to, files, directories, or the like may be pre-positioned at the branch appliance 350.

The pre-positioning controller 1202 may comprise a graphical user interface configured to receive input from the network administrator. According to various embodiments, the graphical user interface may allow the network administrator to generate a pre-positioning command or script indicating a time of transmission of the data. The time of transmission of the data is defined as the time at which the network administration indicates that the data should be sent to the branch office 310. For example, a network administrator may indicate that an update is to be transmitted to the branch office 310 at 2 A.M., when very little traffic is likely to occur over communication network 330.

In one example, the pre-positioning controller 1202 receives the pre-positioning command over an application program interface (API). The pre-positioning controller 1202 can provide a customized API or utilize a standard API. In another example, the pre-positioning controller 1202 receives the pre-positioning command from an operating system or other application. Those skilled in the art will appreciate that there may be many methods of which the pre-positioning controller 1202 receives the pre-positioning command from a user (e.g., network administrator).

According to various embodiments, the pre-positioning controller 1202 may be further configured to execute a pre-positioning command according to a schedule. For example, the pre-positioning command may be executed daily at 2 A.M. In some embodiments, multiple pre-positioning commands may be executed simultaneously. Further, the schedule may instruct the pre-positioning controller 1202 to execute the pre-positioning command at different times for different pre-positioning receivers 1206. For example, the pre-positioning command may be executed at different times based on time zones. For example, a software update may be sent to a branch office 310 in Germany at 3 AM Central European Time (CET) and another branch office 310 in China at 3 AM China Coast Time (CCT). In alternate embodiments, separate pre-positioning commands based on each of the time zones maybe executed. The schedule allows a network administrator to position data in the branch office 310 when a small amount of data is transferred via the communication network 330 to the branch office 310.

According to some embodiments, the pre-positioning command comprises a script configured to instruct the pre-positioning controller 1202 to execute the pre-positioning command. The script may be provided by a user (e.g., the user writes the script) or the script may be generated automatically.

The pre-positioning controller 1202 may be implemented as part of one or more of the central servers 370. According to alternative embodiments, the pre-positioning controller 1202 may be implemented as part of the central appliance 380. The pre-positioning controller 1202 may comprise instructions stored in a memory, wherein the instructions are executable by a processor. The instructions may be implemented or stored as software, hardware, or the like.

Memory subsystems 1204 may be located in the central appliance 380 and/or in the branch appliance 350, and are configured to store data passing through the communication network 330. The memory subsystems 1204 may comprise one or more types of memory, including, but not limited to, read-only memory (ROM), random access memory (RAM), FLASH memory, hard disk, NAS device, or the like. In some embodiments, the memory subsystems 1204 may, be configured to store data and/or overwrite older data according to a first-in-first-out (FIFO) or least recently used (LRU) algorithm. The data may be transmitted from the branch appliance 350 or the central appliance 380, or vice-versa.

The pre-positioning receiver 1206 is configured to receive data transmitted according to the pre-positioning command executed by the pre-positioning controller 1202. In some embodiments, the pre-positioning receiver 1206 may be implemented as a phantom account or virtual client. The pre-positioning receiver 1206 may not be associated with any of the computers 340 or other physical object at the branch office 310. To illustrate, according to various embodiments, the pre-positioning receiver 1206 may comprise a File Transfer Protocol (FTP) server, a Hypertext Protocol (HTP) server, a file system server, or the like. Further, the pre-positioning receiver 1206 may comprise a virtual machine to implement these services.

The pre-positioning receiver 1206 may be a part of the branch appliance 350 and/or the central appliance 380. In alternative embodiments, the pre-positioning receiver 1206 may be associated with one of the computers 340 and/or one of the central servers 370. In some embodiments, the pre-positioning receiver 1206 may be configured to store data associated with the pre-positioning command. In alternative embodiments, the pre-positioning receiver 1206 may be configured to delete the received data upon receipt.

In operation, the network administrator, using an interface at the pre-positioning controller 1202, inputs a pre-positioning command to pre-position data that may be later requested by the computer 340. When the pre-positioning command is executed, data associated with the pre-positioning command is transmitted from the pre-positioning controller 1202 or the central servers 370 to the central appliance 380. According to various embodiments, the central appliance 380 may determine whether the data or a portion of the data is locally accessible to the computers 340 at the branch appliance 350. If the data is locally accessible, the central appliance 380 may transmit a retrieve instruction indicating the data (or portion of the data) to the branch appliance 350. If the data is not locally accessible at the branch appliance 350, the central appliance 380 may transmit the data (or the portion of the data) literally to the branch appliance 350.

The branch appliance 350, upon receiving the data and/or retrieve instruction, stores the data in the memory subsystem 1204 according to an LRU or FIFO algorithm. Thus the data sent according to the pre-positioning command is locally accessible at the branch office 310. If one of the computers 340 requests the data, the branch appliance 350 retrieves the data locally from the memory subsystem 1204 associated with the branch appliance 350. Thus, the data need not be communicated across the communication network 330 if the pre-positioning command has been executed.

The data packets, before reaching the pre-positioning receiver 1206, pass through the memory subsystem 1204. The branch appliance 350 stores and indexes the data packets in the memory subsystem 1204. The pre-positioning receiver 1206 may receive the data.

Figure 13:
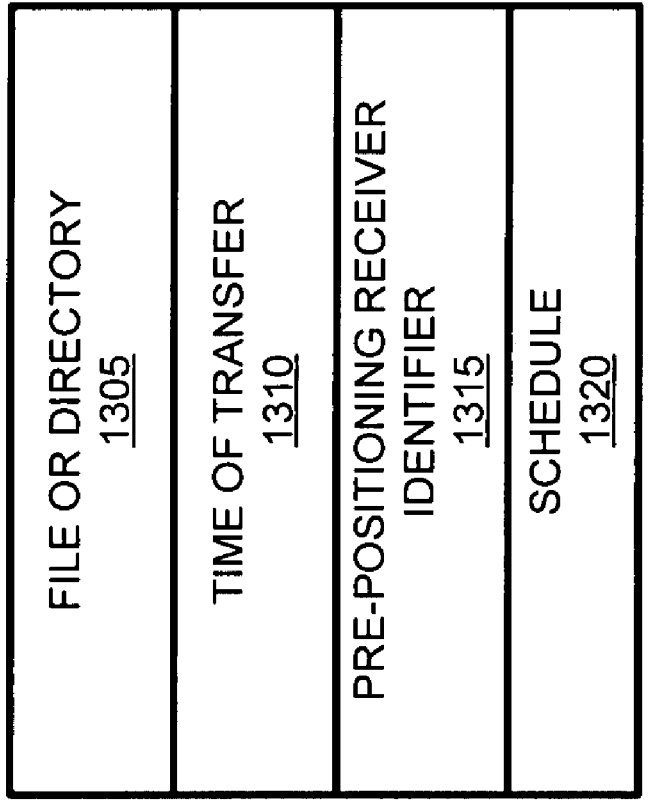
FIG. 13 depicts a block diagram of a pre-positioning command according to exemplary embodiments.

FIG. 13 depicts a block diagram of a pre-positioning command 1300 according to exemplary embodiments. In the embodiment shown, the pre-positioning command 1300 may include information such as a file or directory 1305, a time of transfer 1310, a pre-positioning receiver identifier 1315, and an optional schedule 1320.

The file or directory 1305 may comprise a copy of the file or directory to be pre-positioned. The file or directory 1305 may be received from a network administrator using a graphical user interface and/or be automatically generated by one or more of the central servers 370. For example, one of the central servers 370 may receive a software update and determine whether to transmit the update to the computers 340. In other embodiments, an identifier such as a path or location may be associated with the file or directory 1305 to be transferred from the central office 320 to the branch office 310.

The time of transfer 1310 indicates a time at which the file or directory 1305 is to be pre-positioned at the branch office 310. The time of transfer 1310 may be represented as a time stamp, a countdown, an elapsed time, or the like. The time of transfer 1310 may be optional in embodiments if the pre-positioning command 1300 is executed immediately upon receipt.

The information associated with the pre-positioning receiver identifier 1315 identifies one or more pre-positioning receivers 1206. The pre-positioning receivers 1206 associated with the pre-positioning command 1300 may be selected by a network administrator or be selected automatically based on a previous selection by the network administrator. In some embodiments, the pre-positioning receivers 1206 may be selected based on the type of the file or directory 1305 being transferred.

Optionally, the schedule 1320 may be included in the pre-positioning command 1300. The schedule 1320 indicates two or more scheduled transmissions of the file or directory 1305. The schedule may be periodic, such as daily at 2 A.M.

Figure 14:
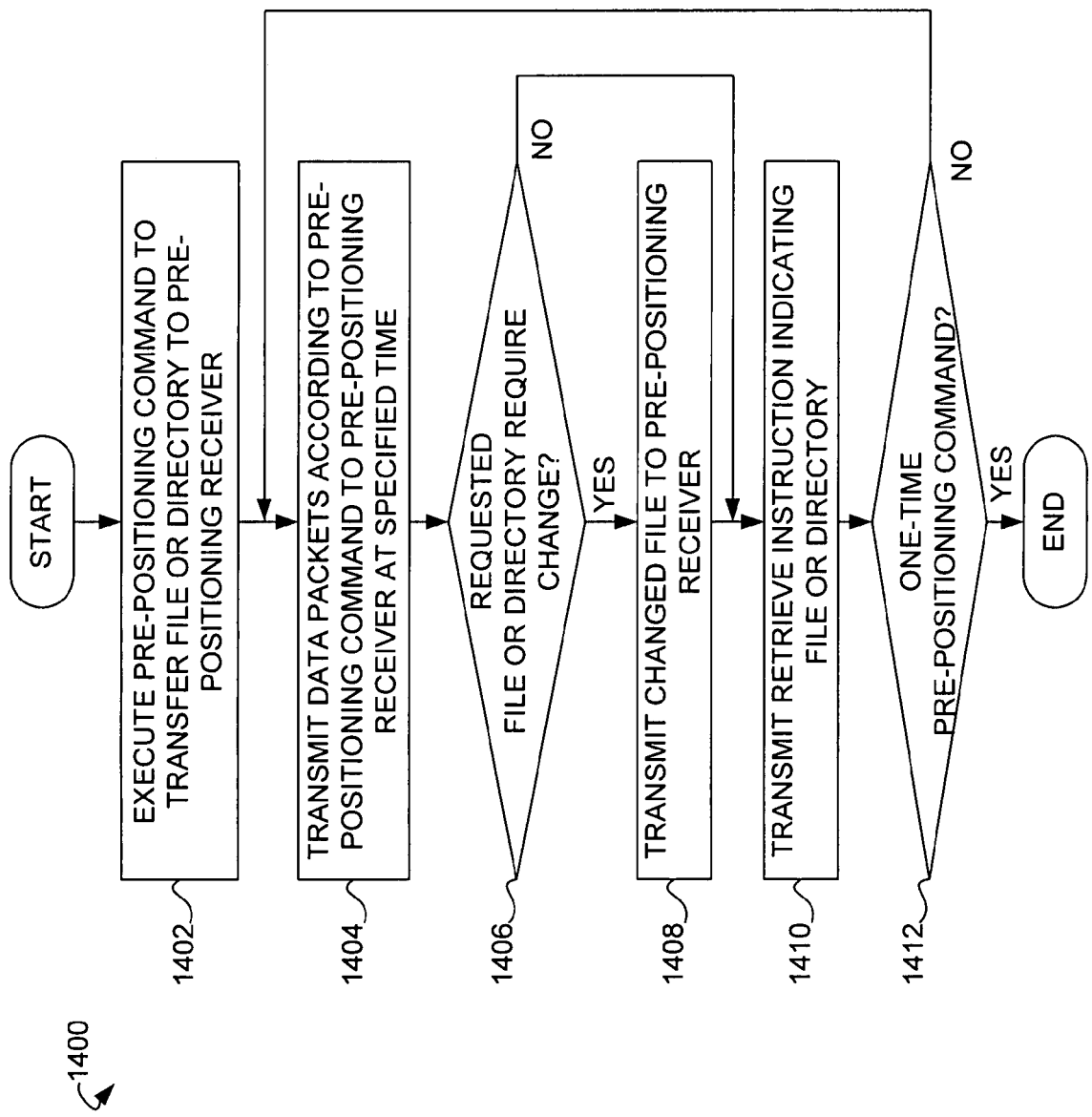
FIG. 14 depicts a flowchart illustrating a process performed by a pre-positioning controller for pushing data to a pre-positioning receive according to exemplary embodiments.

FIG. 14 depicts a flowchart illustrating a process 1400 performed by a pre-positioning controller, such as pre-positioning controller 1202, for pushing data to a pre-positioning receiver 1206, according to exemplary embodiments.

In a step 1402, a pre-positioning command is executed. As discussed herein, the pre-positioning command instructs the pre-positioning controller to transfer a file or directory to one or more of the pre-positioning receivers.

In a step 1404, data packets associated with the file or directory are transmitted according to the pre-positioning command to the pre-positioning receiver at a specified time. The specified time may, according to some embodiments, be the time of transfer or the time at which the pre-positioning command is received from a network administrator. The data packets may be generated by the central appliance as discussed herein. The data packets may comprise literal data and/or retrieve instructions. The data packets are transmitted via the communication network to the pre-positioning receiver.

At a step 1406, one of the computers may request the file or directory. A determination is made as to whether the file or directory has changed since the file or directory was transmitted to the branch office. If the file or directory has changed, the changed file or directory is transmitted to the branch appliance in a step 1408 according to the processes discussed herein.

At a step 1410, a retrieve instruction is transmitted to the branch appliance according to the methods described herein.

At a step 1412, a determination is made as to whether the pre-positioning command is scheduled to occur again or if the pre-positioning command is a one-time command. If the pre-positioning command is scheduled to occur again, the process returns to step 1404.

Figure 15:
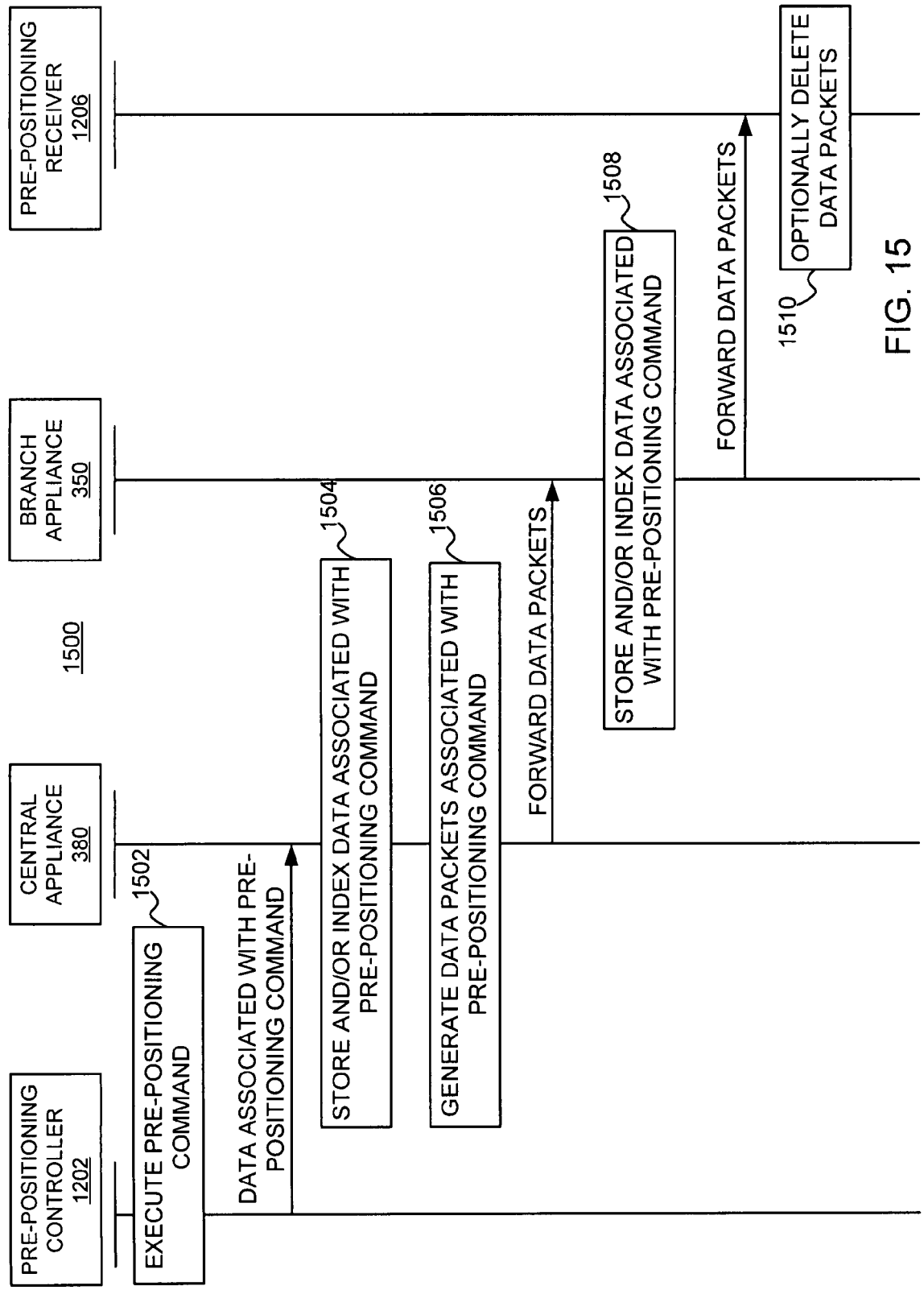
FIG. 15 depicts a message sequence chart of the signals transferred upon execution of a pre-positioning command.

FIG. 15 depicts a message sequence chart 1500 of the signals transferred upon execution of a pre-positioning command according to exemplary embodiments. The signals are transferred between a pre-positioning controller 1202, a central appliance 380, a branch appliance 350, and a pre-positioning receiver 1206.

At 1502, a pre-positioning command 1300 is executed by the pre-positioning controller 1202. The pre-positioning controller 1202 addresses data associated with the pre-positioning command 1300 to the pre-positioning receiver 1206.

At 1504, the central appliance 380 receives the data, stores, and/or indexes the data and generates data packets based on the processes described herein. At 1506, the central appliance 380 generates data packets that will be transmitted to the branch appliance 350 via the communication network 330.

At 1508, the branch appliance 350 stores and indexes the data packets in the memory subsystem 1204 according to the process described herein. The file or directory 1305 is positioned in network memory so that if the file or directory 1305 is requested by one of the computers 340, the file or directory 1305 may be retrieved from the memory subsystem 1204. At 1510, the pre-positioning receiver 1206 receives the file or directory 1305 from the branch appliance 350. Because the computers 340 do not access the pre-positioning receiver 1206 to retrieve the file or directory 1305, the pre-positioning receiver 1206 may optionally delete the received file or directory 1305. It is understood that additional communications, such as acknowledgements, may be transferred in the message sequence chart 1500.

According to various embodiments, the central appliance 380 may perform actions described in connection with the branch appliance 350 and vice-versa. Further, data may be pre-positioned in more than one branch appliance 350.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A network memory system that provides pre-positioned data, the network memory system comprising:
   a first appliance comprising a pre-positioning controller, the first appliance communicatively coupled with and positioned between a first computer and a network; and
   a second appliance comprising a pre-positioning receiver and a second memory, the second appliance communicatively coupled with and positioned between a second computer and the network, the first appliance and the second appliance at different physical locales separated by the network;
   wherein the a pre-positioning controller of the first appliance is configured to execute a pre-positioning command to position data at the second appliance by sending the data from the first appliance to the second appliance, the pre-positioning command executed in anticipation of a request for the data by the second computer; and
   wherein the pre-positioning receiver is configured to receive the sent data according to the executed pre-positioning command, the sent data stored in the second memory of the second appliance and available to the second computer when requested thereby.

2. The network memory system of claim 1, wherein the pre-positioning command indicates a time of transmission of the data.

3. The network memory system of claim 1, wherein the pre-positioning command is scheduled.

4. The network memory system of claim 1, wherein the pre-positioning command comprises a script.

5. The network memory system of claim 1, wherein the pre-positioning receiver comprises a virtual client.

6. The network memory system of claim 1, wherein the pre-positioning receiver is configured to implement a file transfer protocol server.

7. The network memory system of claim 1, wherein the pre-positioning receiver is configured to implement a hypertext transfer protocol server.

8. The network memory system of claim 1, wherein the pre-positioning receiver is configured to implement a file system server.

9. The network memory system of claim 1, wherein the pre-positioning receiver is configured to emulate a file transfer protocol server.

10. The network memory system of claim 1, wherein the pre-positioning receiver is configured to emulate a hypertext transfer protocol server.

11. The network memory system of claim 1, wherein the pre-positioning receiver is configured to emulate a file system server.

12. A method for providing pre-positioned data in a network memory system, the method comprising:
    receiving a pre-positioning command at a pre-positioning controller of a first appliance, the first appliance communicatively coupled with and positioned between a first computer and a network;
    executing the pre-positioning command at the pre-positioning controller to position data at a second appliance by sending the data from the first appliance to the second appliance, the second appliance comprising a pre-positioning receiver and a second memory, the second appliance communicatively coupled with and positioned between a second computer and the network, the first appliance and the second appliance at different physical locales separated by the network, the pre-positioning command executed in anticipation of a request for the data by the second computer;
    receiving the sent data at the pre-positioning receiver according to the executed pre-positioning command; and
    storing the sent data in the second memory of the second appliance to be available to the second computer when requested thereby.

13. The method of claim 12, wherein sending the data is performed according to a time of transmission indicated by the pre-positioning command.

14. The method of claim 12, wherein sending the data is performed according to a schedule.

15. The method of claim 12, wherein the pre-positioning command comprises a script.

16. The method of claim 12, wherein the pre-positioning receiver comprises a virtual client.

17. The method of claim 12, wherein the pre-positioning receiver comprises a file transfer protocol server.

18. The method of claim 12, wherein the pre-positioning receiver comprises a hypertext transfer protocol server.

19. The method of claim 12, wherein the pre-positioning receiver comprises a common internet file system server.

20. The method of claim 12, further comprising emulating a file transfer protocol server by the pre-positioning receiver.

21. The method of claim 12, further comprising emulating a hypertext transfer protocol server by the pre-positioning receiver.

22. The method of claim 12, further comprising emulating a common internet file system server by the pre-prepositioning receiver.

23. A computer readable storage medium having embodied thereon a program, the program being executable by a processor for performing a method for providing pre-positioned data in a network memory system, the method comprising:
    receiving a pre-positioning command at a pre-positioning controller of a first appliance, the first appliance communicatively coupled with and positioned between a first computer and a network;
    executing the pre-positioning command at the pre-positioning controller to position data at a second appliance by sending the data from the first appliance to the second appliance, the second appliance comprising a pre-positioning receiver and a second memory, the second appliance communicatively coupled with and positioned between a second computer and the network, the first appliance and the second appliance at different physical locales separated by the network, the pre-positioning command executed in anticipation of a request for the data by the second computer;
    receiving the sent data at the pre-positioning receiver according to the executed pre-positioning command; and
    storing the sent data in the second memory of the second appliance to be available to the second computer when requested thereby.

24. The computer readable storage medium of claim 23, wherein transmitting the data is performed according to a time of transmission indicated by the pre-positioning command.

25. The computer readable storage medium of claim 23, wherein transmitting the data is performed according to a schedule.

26. The computer readable storage medium of claim 23, wherein the pre-positioning command comprises a script.

* * * * *